US012804443B2

(12) United States Patent
Xu

(10) Patent No.: US 12,804,443 B2
(45) Date of Patent: Nov. 17, 2026

(54) COMMUNICATION METHOD, APPARATUS, NETWORK ELEMENT, CHIP, STORAGE MEDIUM, PRODUCT, AND PROGRAM

(71) Applicant: GUANGDONG OPPO MOBILE TELECOMMUNICATIONS CORP., LTD., Dongguan (CN)

(72) Inventor: Yang Xu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 306 days.

(21) Appl. No.: 18/769,941

(22) Filed: Jul. 11, 2024

(65) Prior Publication Data

US 2024/0365156 A1 Oct. 31, 2024

Related U.S. Application Data

(63) Continuation of application No. PCT/CN2022/072098, filed on Jan. 14, 2022.

(51) Int. Cl.

*H04W 24/10* (2009.01)
*H04L 43/0829* (2022.01)
*H04L 43/087* (2022.01)

(52) U.S. Cl.

CPC ......... *H04W 24/10* (2013.01); *H04L 43/0829* (2013.01); *H04L 43/087* (2013.01)

(58) Field of Classification Search

CPC ..... H04W 24/10; H04W 24/02; H04W 24/08; H04L 43/0829; H04L 43/087; H04L 41/0894; H04L 43/0852

See application file for complete search history.

(56) References Cited

U.S. PATENT DOCUMENTS

2020/0145864 A1* 5/2020 Liu ........................ H04W 24/10
2023/0388863 A1* 11/2023 Li ........................ H04L 41/0894

FOREIGN PATENT DOCUMENTS

CN 112042233 A 12/2020
CN 113557762 A 10/2021
WO 2020167820 A1 8/2020

OTHER PUBLICATIONS

S2-2100850-23.501 Correction on QoS monitoring for URLLC; 3GPP TSG-WG SA2 Meeting #143E e-meeting; Feb 24-Mar. 9, 2021; Elbonia.

(Continued)

*Primary Examiner* — Hashim S Bhatti
(74) *Attorney, Agent, or Firm* — BAYES PLLC

(57) ABSTRACT

A controlling network element includes a processor and a memory. The memory is configured to store a computer program. The processor is configured to invoke and execute the computer program stored in the memory to cause the controlling network element to perform: transmitting first information to an executing network element, the first information including a measurement policy; where the measurement policy includes at least one of: a first measurement parameter, a selecting condition for a terminal device, a measurement behavior, or a reporting way; the first measurement parameter includes at least one of: a delay, a rate, a bandwidth, a packet loss rate, a jitter rate, or a disorder rate.

18 Claims, 8 Drawing Sheets

(56) References Cited

OTHER PUBLICATIONS

3GPP TS 23.501;3rd Generation Partnership Project; Technical Specification Group Services and System Aspects; System architecture for the 5G System (5GS); Stage 2(Release 17).

International Search Report and Written Opinion of the International Searching Authority regarding International Patent Application No. PCT/CN2022/072098, dated Jul. 28, 2022. Translation provided by WIPO Translate.

* cited by examiner

COMMUNICATION METHOD, APPARATUS, NETWORK ELEMENT, CHIP, STORAGE MEDIUM, PRODUCT, AND PROGRAM

CROSS-REFERENCE TO RELATED APPLICATION

This application is a Continuation Application of PCT/CN2022/072098 filed Jan. 14, 2022, which is incorporated herein by reference in its entirety.

TECHNICAL FIELD

Embodiments of the present disclosure relate to the field of mobile communication technology, and in particular, to a communication method, apparatus, network element, chip, storage medium, product, and program.

BACKGROUND

In the 3rd Generation Partnership Project (3GPP), a delay measurement on a single terminal device may be implemented. However, relevant arts have not considered a solution of measuring according to an instruction.

SUMMARY

A communication method, apparatus, network element, chip, storage medium, product and program are provided in the embodiments of the present disclosure.

In a first aspect, a communication method is provided in the embodiments of the present disclosure, and the method includes:

transmitting, by a controlling network element, first information to an executing network element, the first information including a measurement policy;

where the measurement policy includes at least one of: a first measurement parameter, a selecting condition for a terminal device, a measurement behavior, or a reporting way;

the first measurement parameter includes at least one of: a delay, a rate, a bandwidth, a packet loss rate, a jitter rate, or a disorder rate.

In a second aspect, a communication method is provided in the embodiments of the present disclosure, and the method includes:

receiving, by an executing network element, first information transmitted by a controlling network element, the first information including a measurement policy;

where the measurement policy includes at least one of: a first measurement parameter, a selecting condition for a terminal device, a measurement behavior, or a reporting way;

the first measurement parameter includes at least one of: a delay, a rate, a bandwidth, a packet loss rate, a jitter rate, or a disorder rate.

In a third aspect, a communication apparatus is provided in the embodiments of the present disclosure, and the communication apparatus includes:

a transceiver unit, configured to transmit first information to an executing network element, the first information including a measurement policy;

where the measurement policy includes at least one of: a first measurement parameter, a selecting condition for a terminal device, a measurement behavior, or a reporting way;

the first measurement parameter includes at least one of: a delay, a rate, a bandwidth, a packet loss rate, a jitter rate, or a disorder rate.

In a fourth aspect, a communication apparatus is provided in the embodiments of the present disclosure, and the communication apparatus includes:

a transceiver unit, configured to receive first information transmitted by a controlling network element, the first information including a measurement policy;

where the measurement policy includes at least one of: a first measurement parameter, a selecting condition for a terminal device, a measurement behavior, or a reporting way;

the first measurement parameter includes at least one of: a delay, a rate, a bandwidth, a packet loss rate, a jitter rate, or a disorder rate.

In a fifth aspect, a controlling network element is provided in the embodiments of the present disclosure, including: a processor and a memory, where the memory is configured to store a computer program, the processor is configured to invoke and execute the computer program stored in the memory to perform the method according to the first aspect.

In a sixth aspect, an executing network element is provided in the embodiments of the present disclosure, including: a processor and a memory, where the memory is configured to store a computer program, the processor is configured to invoke and execute the computer program stored in the memory to perform the method according to the second aspect.

In a seventh aspect, a chip is provided in the embodiments of the present disclosure, including: a processor configured to invoke and execute a computer program from a memory, to cause a device equipped with the chip to perform the method according to the first aspect, or cause a device equipped with the chip to perform the method according to the second aspect.

In an eighth aspect, a non-transitory computer storage medium is provided in the embodiments of the present disclosure, the non-transitory computer storage medium is used for storing a computer program, where the computer program causes a controlling network element to perform the method according to the first aspect, or the computer program causes an executing network element to perform the method according to the second aspect.

In a ninth aspect, a computer program product is provided in the embodiments of the present disclosure, the computer program product includes a computer program instruction, where the computer program instruction causes a controlling network element to perform the method according to the first aspect, or the computer program instruction causes an executing network element to perform the method according to the second aspect.

In a tenth aspect, a computer program is provided in the embodiments of the present disclosure, the computer program causes a controlling network element to perform the method according to the first aspect, or the computer program causes an executing network element to perform the method according to the second aspect.

BRIEF DESCRIPTION OF THE DRAWINGS

The drawings illustrated herein are used to provide further understanding of the present disclosure and constitute a part of the present disclosure. The schematic embodiments of the present disclosure and the description thereof are used to explain the present disclosure, and do not constitute improper limitations on the present disclosure. In the drawings.

DETAILED DESCRIPTION

Figure 1:
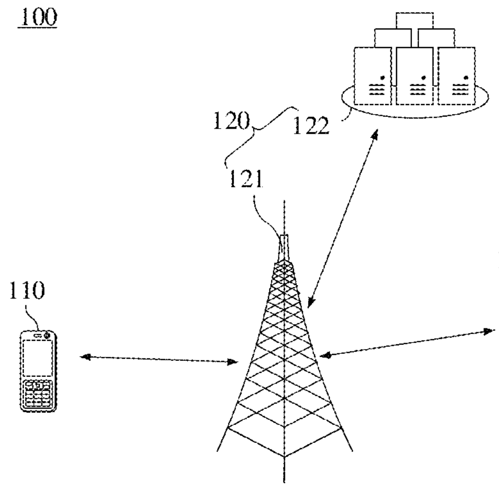
FIG. 1 is a schematic diagram of an application scenario of an embodiment of the present disclosure.

The technical solutions in the embodiments of the present disclosure will be described in conjunction with the drawings in the embodiments of the present disclosure, and apparently, the described embodiments are a part of embodiments of the present disclosure, but not all embodiments. Based on the embodiments of the present disclosure, all other embodiments obtained by the ordinary skilled in the art belong to the protection scope of the present disclosure. The technical solutions recorded in the embodiments of the present disclosure may be combined arbitrarily without conflict. In the description of the present disclosure, "a plurality of" means two or more, unless otherwise explicitly and specifically limited.

The present disclosure provides a communication method applied to a controlling network element. The method includes:

transmitting, by a controlling network element, first information to an executing network element, the first information including a measurement policy;

where the measurement policy includes at least one of: a first measurement parameter, a selecting condition for a terminal device, a measurement behavior, or a reporting way; and the first measurement parameter includes at least one of: a delay, a rate, a bandwidth, a packet loss rate, a jitter rate, or a disorder rate.

In the following, some implementations of the method are provided, which may be incorporated with each other.

Optionally, the selecting condition for a terminal device includes at least one of:

a terminal device in a connecting state within a specific time range;

a terminal device within a specific area;

a terminal device with a delay lower than a first threshold;

one or more terminal devices with a lowest delay;

a terminal device with a rate higher than or equal to a second threshold;

one or more terminal devices with a highest rate;

a terminal device with a bandwidth greater than or equal to a third threshold;

one or more terminal devices with a largest bandwidth;

a terminal device with a packet loss rate lower than a fourth threshold;

one or more terminal devices with a lowest packet loss rate;

a terminal device with a jitter rate lower than a fifth threshold;

one or more terminal devices with a lowest jitter rate;

a terminal device with a disorder rate lower than a sixth threshold; or one or more terminal devices with a lowest disorder rate.

Optionally, the measurement behavior includes one of:

a measurement value of the first measurement parameter being a measurement value in a last time;

a measurement value of the first measurement parameter being a statistical parameter of measurement values in last Q times, where the Q is greater than or equal to 2;

a measurement value of the first measurement parameter being a statistical parameter of measurement values within a first time period, where the first time period is preconfigured, or is indicated in the first information.

Optionally, the reporting way includes at least one of:

the executing network element reporting at least one identification of at least one terminal device via a control plane network element;

the executing network element reporting at least one identification of at least one terminal device via a user plane network element;

the executing network element reporting at least one identification of at least one terminal device at a specific time;

the executing network element reporting at least one identification of at least one terminal device periodically; or the executing network element in a set area reporting at least one identification of at least one terminal device.

Optionally, the first information further includes a group message corresponding to a first group.

Optionally, the group message corresponding to the first group includes at least one of: an identification of the first group, all or a portion of identifications of terminal devices in the first group, or attribute information of the first group.

Optionally, the first information further includes: an identification of a terminal device that transmits joining of the first group to the controlling network element and/or an identification of a terminal device consenting to measure.

Optionally, the identification of the terminal device consenting to measure is included in identifications of terminal devices that transmit consenting-to-measure to the controlling network element, or is obtained by the controlling network element from a unified data management (UDM) network element and/or a unified data repository (UDR) network element.

Optionally, the identification of the terminal device consenting to measure is an identification of a terminal device with the first measurement parameter in the measurement policy included in a second measurement parameter consented to measure, among identifications of terminal devices that transmit consenting-to-measure to the controlling network element, and/or an identification of a terminal device consenting to report a measurement value, and/or an identification of a terminal device consenting to report to an application server.

Optionally, the method further includes:

receiving, by the controlling network element, request information transmitted by a candidate terminal device or an application server; where the request information indicates that: the candidate terminal device joins the first group and/or the candidate terminal device consents to measure.

Optionally, the method further includes:

receiving, by the controlling network element, at least one identification of at least one terminal device transmitted by the executing network element; where the at least one identification of the at least one terminal device is determined based on the first information; and transmitting, by the controlling network element, the at least one identification of the at least one terminal device, to an application server.

Optionally, the controlling network element includes at least one of: a session management function (SMF) network element, or a policy control function (PCF) network element; and/or the executing network element includes: a user plane function (UPF) network element and/or a local-network exposure function (L-NEF) network element.

In addition, the present disclosure further provides a communication method applied to an executing network element. The method includes:

receiving, by an executing network element, first information transmitted by a controlling network element, the first information including a measurement policy;

where the measurement policy includes at least one of: a first measurement parameter, a selecting condition for a terminal device, a measurement behavior, or a reporting way;

the first measurement parameter includes at least one of: a delay, a rate, a bandwidth, a packet loss rate, a jitter rate, or a disorder rate.

In the following, some implementations of the method are provided, which may be incorporated with each other.

Optionally, the selecting condition for a terminal device includes at least one of:

a terminal device in a connecting state within a specific time range;

a terminal device within a specific area;

a terminal device with a delay lower than a first threshold;

one or more terminal devices with a lowest delay;

a terminal device with a rate higher than or equal to a second threshold;

one or more terminal devices with a highest rate;

a terminal device with a bandwidth greater than or equal to a third threshold;

one or more terminal devices with a largest bandwidth;

a terminal device with a packet loss rate lower than a fourth threshold;

one or more terminal devices with a lowest packet loss rate;

a terminal device with a jitter rate lower than a fifth threshold;

one or more terminal devices with a lowest jitter rate;

a terminal device with a disorder rate lower than a sixth threshold; or one or more terminal devices with a lowest disorder rate.

Optionally, the measurement behavior includes one of:

a measurement value of the first measurement parameter being a measurement value in a last time;

a measurement value of the first measurement parameter being a statistical parameter of measurement values in last Q times, where the Q is greater than or equal to 2;

a measurement value of the first measurement parameter being a statistical parameter of measurement values within a first time period, where the first time period is preconfigured, or is indicated in the first information.

Optionally, the reporting way includes at least one of:

the executing network element reporting at least one identification of at least one terminal device via a control plane network element;

the executing network element reporting at least one identification of at least one terminal device via a user plane network element;

the executing network element reporting at least one identification of at least one terminal device at a specific time;

the executing network element reporting at least one identification of at least one terminal device periodically; or the executing network element in a set area reporting at least one identification of at least one terminal device.

Optionally, the first information further includes a group message corresponding to a first group.

Optionally, the group message corresponding to the first group includes at least one of: an identification of the first group, all or a portion of identifications of terminal devices in the first group, or attribute information of the first group.

Optionally, the first information further includes: an identification of a terminal device that transmits joining of the first group to the controlling network element and/or an identification of a terminal device consenting to measure.

Optionally, the method further includes:

transmitting, by the executing network element, at least one identification of at least one terminal device to an application server, or transmitting, by the executing network element, at least one identification of at least one terminal device to the controlling network element; where the at least one identification of the at least one terminal device is determined based on the first information.

Optionally, the method further includes:

in a case where the first information includes the delay, transmitting, by the executing network element, a measurement data packet to an access network device;

receiving, by the executing network element, a reply data packet transmitted by the access network device;

determining, by the executing network element, a delay based on a time of transmitting the measurement data packet, a time of receiving the reply data packet, and time information carried in the reply data packet;

determining, by the executing network element, at least one identification of at least one terminal device based on the delay.

Optionally, the method further includes:

in a case where the first information includes the delay, transmitting, by the executing network element, a measurement data packet to a candidate terminal device;

receiving, by the executing network element, a reply data packet transmitted by the candidate terminal device;

determining, by the executing network element, the delay based on a time of transmitting the measurement data packet, a time of receiving the reply data packet, and time information carried in the reply data packet;

determining, by the executing network element, at least one identification of at least one terminal device based on the delay.

Optionally, the time information includes at least one of:

a time point at which the measurement data packet and/or the reply data packet is received by a core network node, an access network device, and/or a candidate terminal device;

a time point at which the measurement data packet and/or the reply data packet is transmitted by a core network node, an access network device, and/or a candidate terminal device;

a data transmission latency of an access network device and a candidate terminal device; or a data transmission latency of an access network device and a core network node.

Optionally, a packet header of the measurement data packet carries a first indication; the first indication is used to indicate a measurement delay.

Optionally, the controlling network element includes at least one of: a session management function (SMF) network element, or a policy control function (PCF) network element; and/or the executing network element includes: a user plane function (UPF) network element and/or a local-network exposure function (L-NEF) network element.

FIG. 1 is a schematic diagram of an application scenario of an embodiment of the present disclosure. As shown in FIG. 1, a communication system 100 may include a terminal device 110 and a network device 120. The network device 120 may communicate with the terminal device 110 via an air interface. Multi-service transmission is supported between the terminal device 110 and the network device 120.

It should be understood that the embodiments of the present disclosure exemplarily illustrate only the communication system 100, but the embodiments of the present disclosure are not limited thereto. That is, the technical solutions of the embodiments of the present disclosure may be applied to various communication systems, such as: a Long Term Evolution (LTE) system, an LTE Time Division Duplex (TDD), a Universal Mobile Telecommunication System (UMTS), an Internet of Things (IoT) system, a Narrow Band Internet of Things (NB-IoT) system, an enhanced Machine-Type Communications (eMTC) system, a 5th generation (5G) communication system (also called as a New Radio (NR) communication system), or a future communication system (such as 6G, 7G communication systems), etc.

In the communication system 100 shown in FIG. 1, the network device 120 may be an access network device that communicates with the terminal device 110. The access network device may provide communication coverage for a specific geographical area, and may communicate with the terminal equipment 110 located within the coverage area.

The terminal device may be referred to as a user equipment (UE), a mobile station (MS), a mobile terminal (MT), a user unit, a user station, a mobile station, a remote station, a remote terminal, a mobile device, a user terminal, a terminal, a wireless communication device, a user agent or a user apparatus. The terminal device may be any device that can communicate with the access network device.

The network device in the embodiments of the present disclosure may include an access network device 121 and/or a core network device 122.

The access network device 121 may include one of, or a combination of at least two of: an evolutional base station (Evolutional Node B, eNB or eNodeB) in a Long Term Evolution (LTE) system, a Next Generation Radio Access Network (NG RAN) device, a base station (gNB) in an NR system, a small station, a micro station, a wireless controller in a Cloud Radio Access Network (CRAN), an access point of Wireless-Fidelity (Wi-Fi), a transmission reception point (TRP), a relay station, an access point, a vehicle-mounted device, a wearable device, a hub, a switch, a network bridge, a router, a network device in a future evolved Public Land Mobile Network (PLMN), etc.

The core network device 122 may be a 5G core network (5G Core, 5GC) device, and the core network device 122 may include one of, or a combination of at least two of: an Access and Mobility Management Function (AMF), an Authentication Server Function (AUSF), a User Plane Function (UPF), Session Management Function (SMF), a Location Management Function (LMF), and a Policy Control Function (PCF). In some other implementations, the core network device may also be an Evolved Packet Core (EPC) device of an LTE network, for example, a Session Management Function+Core Packet Gateway (SMF+PGW-C) device. It should be understood that the SMF+PGW-C may implement both a function that the SMF can implement and a function that the PGW-C can implement. In a process of the network evolution, the above-mentioned core network device 122 may also be called as other names, or form a new network entity by dividing functions of the core network, and the embodiments of the present disclosure are not limited thereto.

Connections may also be established between various functional units in the communication system 100 via a next generation network (next generation, NG) interface to implement the communication. For example, the terminal device establishes an air interface connection with the access network device via an NR interface, for transmitting user plane data and control plane signaling; the terminal device may establish a control plane signaling connection with the AMF via an NG interface 1 (N1 for short); the access network device, e.g., a next generation radio access base station (gNB) may establish a user plane data connection with the UPF via an NG interface 3 (N3 for short); the access network device may establish a control plane signaling connection with the AMF via an NG interface 2 (N2 for short); the UPF may establish a control plane signaling connection with the SMF via an NG interface 4 (N4 for short); the UPF may exchange user plane data with a data network via an NG interface 6 (N6 for short); the AMF may establish a control plane signaling connection with the SMF via an NG interface 11 (N11 for short); the SMF may establish a control plane signaling connection with the PCF via an NG interface 7 (N7 for short).

One base station, one core network device and two terminal devices are exemplarily shown in FIG. 1, and in some embodiments, the wireless communication system 100 may include multiple base station devices, and other numbers of terminal devices within a coverage range of each base station, which are not limited to the embodiments of the present disclosure.

It needs to be noted that FIG. 1 illustrates the system for which the present disclosure is applicable, only in a form of an example, and of course, the method illustrated in the embodiments of the present disclosure may also be applicable for other systems. Furthermore, the terms "system" and "network" herein are often used interchangeably herein. The term "and/or" herein is only an association relationship for describing associated objects, meaning that there may be three kinds of relationships, for example, A and/or B may mean three cases where: A exists alone, both A and B exist, and B exists alone. In addition, a character "/" herein generally means that associated objects before and after "/" are in an "or" relationship. It also should be understood that, the "indicate/indication/indicating/indicated" mentioned in the embodiments of the present disclosure may be a direct indication, may also be an indirect indication, or may also represent having an association relationship. For example, A indicating B, may mean that A directly indicates B, for example, B may be obtained via A; may also mean that A indirectly indicates B, for example, A indicates C, and B may be obtained via C; may also mean that there is an association relationship between A and B. It also should be understood that, the "correspond/corresponding" mentioned in the embodiments of the present disclosure may mean that there is a direct correspondence or indirect correspondence between two objects, may also mean that there is an association relationship between the two objects, or may also mean relationships of indicating and being indicated, of configuring and being configured, etc. It should also be understood that the "predefined", "agreed with a protocol", "predetermined", or "predefined rule" mentioned in the embodiments of the present disclosure may be implemented by pre-saving corresponding codes, tables or other manners that may be used for indicating related information, in the device (for example, including the terminal device and the network device), and the present disclosure does not limit its specific implementation. For example, the predefined may refer to what is defined in a protocol. It should further be understood that, in the embodiments of the present disclosure, the "protocol" may refer to a standard protocol in the field of communication, which may include, for example, an LTE protocol, an NR protocol, and related protocols applied in the future communication system, and the present disclosure is not limited thereto.

To facilitate understanding of the technical solutions of the embodiments of the present disclosure, the relevant technologies of the embodiments of the present disclosure are illustrated below, and the following related technologies may be, as optional solutions, arbitrarily combined with the technical solutions of the embodiments of the present disclosure, which all belong to the protection scope of the embodiments of the present disclosure.

Figure 2:
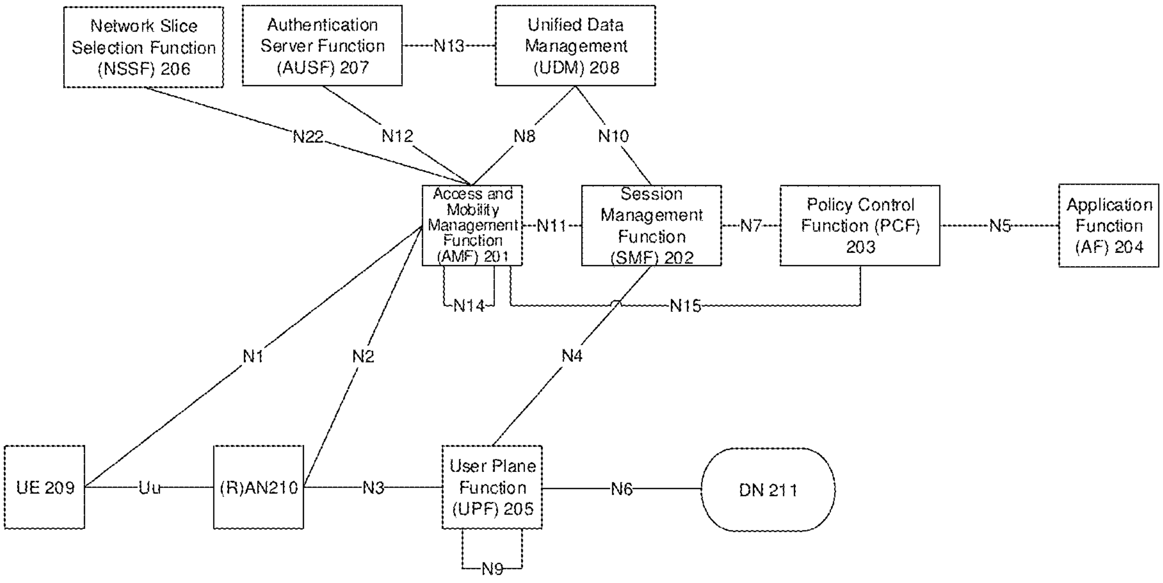
FIG. 2 is a schematic diagram of a system architecture based on a reference point presentation way provided in an embodiment of the present disclosure.

FIG. 2 is a schematic diagram of a system architecture based on a reference point presentation way provided in an embodiment of the present disclosure, and as shown in FIG. 2, the reference point presentation way may illustrate that there may be interactions between the corresponding network function (NF) services. The network function includes, for example, an Access and Mobility Management Function (AMF) 201, a Session Management Function (SMF) 202, a Policy Control Function (PCF) 203, an Application Function (AF) 204, a User Plane Function (UPF) 205, a Network Slice Selection Function (NSSF) 206, an Authentication Server Function (AUSF) 207 and a Unified Data Management (UDM) 208, etc. The system may further include: a UE 209, a Radio Access Network (RAN) or an Access Node (AN) 210, and a Data Network (DN) 211.

FIG. 2 illustrates the following reference points: an N1 (between the UE 209 and the AMF 201), an N2 (between the RAN 210 and the AMF 201), an N3 (between the RAN 210 and the UPF 205), an N4 (between the SMF 202 and the UPF 205), an N5 (between the PCF 203 and the AF 204), an N6 (between the UPF 205 and the DN 211), an N7 (between the SMF 202 and the PCF 203), an N8 (between the UDM 208 and the AMF 201), an N9 (between two UPFs 205), an N10 (between the UDM 208 and the SMF 202), an N11 (between the AMF 201 and the SMF 202), an N12 (between the AUSF 207 and the AMF 201), an N13 (between the AUSF 207 and the UDM 208), an N14 (between two AMFs 201), an N15 (between the PCF 203 and the AMF 201 in a non-roaming scenario, or between the PCF 203 and a visited network & the AMF 201 in a roaming scenario), an N16 (between two SMFs; which is not shown) and N22 (between the AMF 201 and the NSSF 206).

The SMF, the PCF and the AF are described as follows.

The SMF: includes establishment, modification and release for a session; tunnel maintenance between the UPF and the AN nodes; terminal Internet Protocol (IP) address allocation and management; selection and controlling for a UPF function; charging data collection and charging interface support, etc.

The PCF: supports a unified policy framework to manage a network behavior, and provides an operator network controlling policy to other network elements and terminals.

The AF: may be an application within an operator, such as an IP multimedia system (IP Multimedia Subsystem, IMS), or may also be a service of a third party, such as a web service, a video, or a game, etc. If the AF is an AF within the operator, and is in a trusted domain with other NFs, the AF directly interacts with the other NFs for access; if the AF is not in the trusted domain, it needs a Network Exposure Function (NEF) to access other NFs.

The UE performs connecting of an access layer, exchanges a message of the access layer and performs wireless data transmission, with the AN via the Uu port, and the UE performs connecting of a Non-Access Stratum (NAS), and exchanges an NAS message, with the AMF via the N1 port. The AMF is a mobility management function in the core network, and the SMF is a session management function in the core network, and in addition to the mobility management for the UE, the AMF is also responsible for forwarding a session management-related message between the UE and the SMF. The PCF is a policy management function in the core network, and is responsible for formulating related policies for mobility management, session management, and charging of the UE, etc. The UPF is a user plane function in the core network, transmits data with an external data network via the N6 interface, and transmits data with the AN via the N3 interface.

Figure 3:
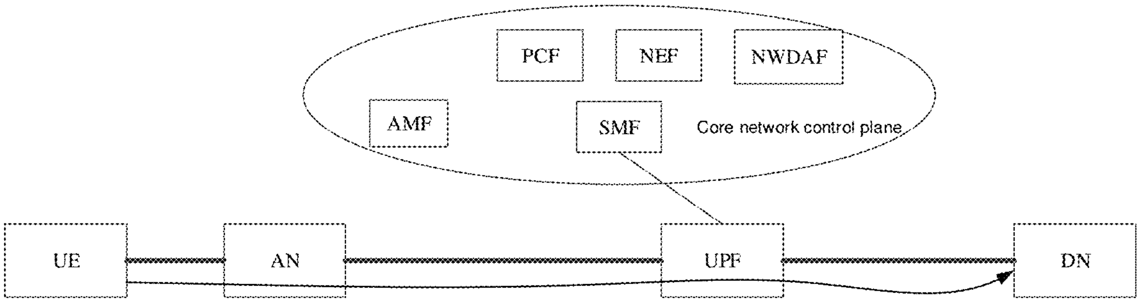
FIG. 3 is a schematic diagram of an architecture of a communication system provided in an embodiment of the present disclosure.

FIG. 3 is a schematic diagram of an architecture of a communication system provided in an embodiment of the present disclosure, and as shown in FIG. 3, when the UE transmits uplink data, by establishing a Packet Data Unit (PDU) session (a connection between the UE and the UPF) through interacting with core network control plane network elements, or by transmits to the UPF via the AN through a protocol of the PDU session, the UPF performs a next-hop routing according to an IP address of a target server, and finally transmits a data packet to the application server (a server on the DN). Similarly for downlink data, after receiving a data packet from the DN, the UPF determines to bind to the corresponding PDU session according to a downlink target IP address, and transmits the data to the UE through the PDU session.

Optionally, the core network control plane network elements may include at least one of: the PCF, the NEF, a Network Data Analytics Function (NWDAF), the AMF, or the SMF.

A concept of a Quality of Service (QOS) flow has been introduced in the 5G network, after the UE accesses to the 5G network via the Uu interface, the QoS flows are established under the control of the SMF, for data transmission, and the SMF provides the access network device with QoS flow configuration information of each QoS flow, specifically including at least one of: a 5G QoS identifier (5QI), an allocation and retention priority (ARP), a coding rate requirement, or other information, where a value of the 5QI (also called as a 5QI or a 5QI Value) is an index value that may correspond to a QoS feature such as a delay, a bit error rate requirement, etc., and the ARP is a priority by which the access network device allocates or maintains resources for the QoS flows. For each QoS flow, the access network device schedules radio resources according to the QoS flow configuration information received from the SMF, to ensure a QOS requirement of the QoS flow.

Figure 4:
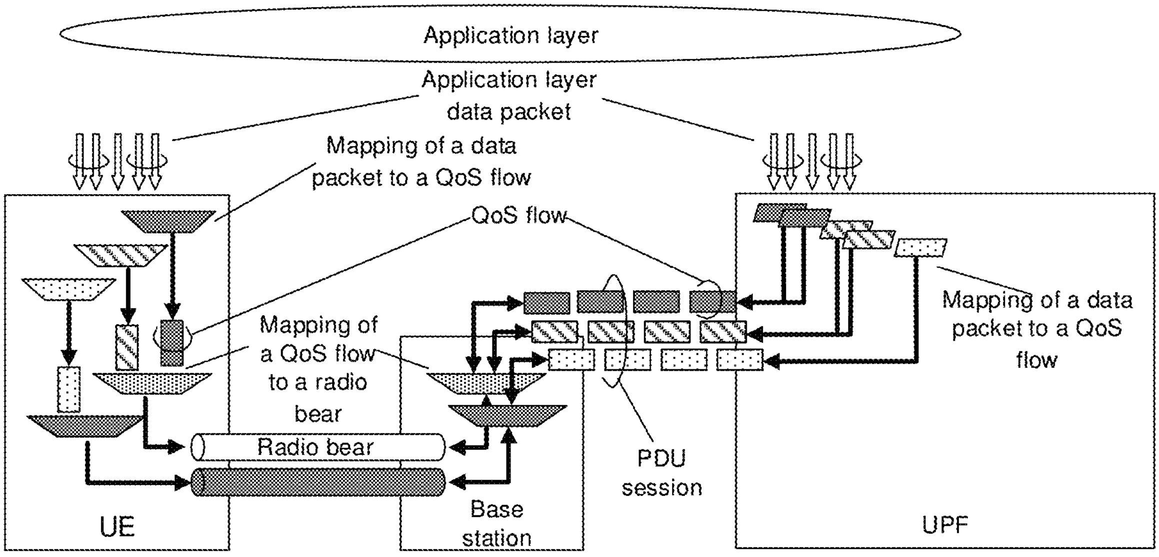
FIG. 4 is a schematic diagram of a QoS model of the 5G network provided in an embodiment of the present disclosure.

FIG. 4 is a schematic diagram of a QoS model of the 5G network provided in an embodiment of the present disclosure, and as shown in FIG. 4, an application layer transmits an application layer data packet, and the application layer data packet may implement a mapping to a QoS flow, to obtain the QoS flow. The QoS flow may implement a mapping to a radio bearer, so that a service data flow may be transmitted by the radio bearer. Herein, the QoS flow is used to transmit the service data flow, one QoS flow may be used to transmit multiple service data flows, and one protocol data unit session may at most include 64 QoS flows. A GPRS Tunneling Protocol (GTP) tunnel between the 5GC and the RAN is at a level of the PDU session, where GPRS is an abbreviation of General Packet Radio Service, a packet header of a data packet transmitted in the tunnel carries a QoS Flow identity (QFI), and the access network device identifies different QoS flows according to the QFI in the packet header, and the access network device processes the mapping of QoS flows and radio bears through a Service Data Adaptation Protocol (SDAP) layer.

In order to ensure the transmission of data, the mobile network generally uses the QoS mechanism, where a set of QoS parameters are used for data transmission of one or more QoS data flows or bearers. The one or more QoS data flows may be mapped onto one data radio bearer (DRB) for transmission.

The uplink QoS data flow is bound by the UE. The UE determines which QoS data flow the different data packets need to be bound to for transmission, according to a QoS rule. And, the downlink QoS data flow is bound by using the UPF, the UPF determines which QoS data flow the different data packets need to be bound to for transmission, according to a packet detection rule (PDR).

The QFI identification is added in an SDAP packet header between the UE and the AN, and the QFI identification is added in a GPRS Tunneling Protocol-User Plane (GTP-U) packet header between the AN and the UPF, in this way, the UE, the AN and the UPF may all know which QoS flow the data packet corresponds to. In some cases, the SDAP packet header does not need, the corresponding QoS flow may be known between the UE and the AN according to a mapping relationship between DRBs and QoS flows, without the SDAP packet header explicitly carrying the QFI.

Figure 5:
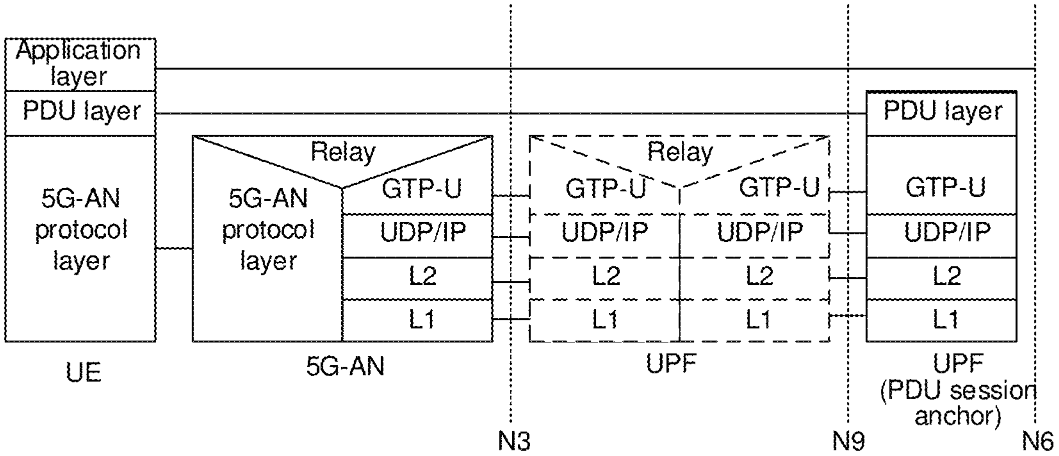
FIG. 5 is a schematic diagram of a user plane protocol stack provided in an embodiment of the present disclosure.

FIG. 5 is a schematic diagram of a user plane protocol stack provided in an embodiment of the present disclosure, and as shown in FIG. 5, the terminal device includes an application layer, a PDU layer, a 5G-AN protocol layer. The 5G-AN is used for a relay between the UE and the UPF, the 5G-AN communicates with UE through the 5G-AN protocol layer, and the 5G-AN also includes a GTP-U layer, a User Datagram Protocol (UDP)/Internet Protocol (IP) layer, an L2 layer, and an L1 layer. The UPF may be a PDU session anchor, and the UPF includes a PDU layer, a GTP-U layer, a UDP/IP layer, an L2 layer and an L1 layer. The AN communicates with the UPF via an N3, the UPFs communicate with each other via an N9, and the UPF communicates with the DN via a N6.

In the relevant arts, it may be implemented that a delay of an uplink, a downlink or a round-trip of a single terminal is measured based on the user plane, and a measurement result is reported to the control plane network element or transmitted to the application server. However, in the relevant arts, it may not be implemented that a batch of measurements is performed based on a measurement requirement of a third party, and since the relevant arts are limited to only measuring a delay of a single data packet, the measurement content is single.

In the embodiments of the present disclosure, the PCF and the PCF network element are understood as the same, the SMF and the SMF network element are understood as the same, and the UPF and the UPF network element are understood as the same. In some other embodiments, the PCF network element, the SMF network element, and the UPF network element may also be referred to as a PCF entity, an SMF entity, and a UPF entity. The technical solutions of the present disclosure are described in detail below by specific embodiments, and the above solutions may be, as optional solutions, combined with the following technical solutions of the embodiments of the present disclosure arbitrarily.

To facilitate understanding of the technical solutions of the embodiments of the present disclosure, the following solutions may be combined arbitrarily, which belong to the protection scope of the embodiments of the present disclosure.

Figure 6:
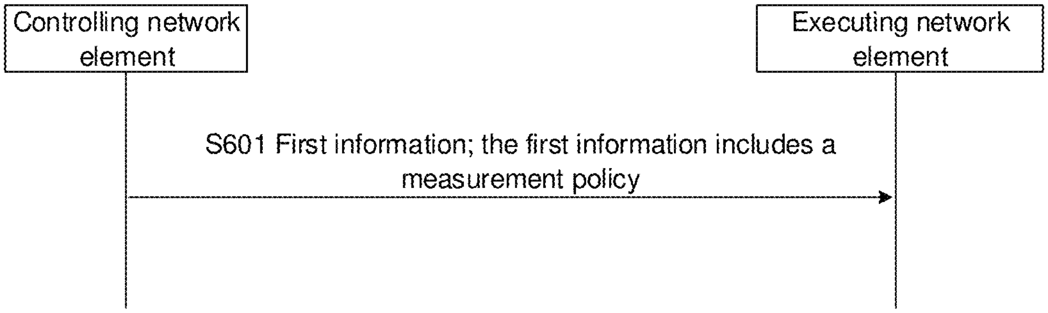
FIG. 6 is a flow schematic diagram of a communication method provided in an embodiment of the present disclosure.

FIG. 6 is a flow schematic diagram of a communication method provided in an embodiment of the present disclosure, and as shown in FIG. 6, the method includes the following steps.

S601, a controlling network element transmits first information to an executing network element; the executing network element receives the first information transmitted by the controlling network element; and the first information includes a measurement policy.

Herein, the measurement policy includes (or indicates) at least one of: a first measurement parameter, a selecting condition for a terminal device, a measurement behavior, or a reporting way;

the first measurement parameter includes at least one of:
- a delay, a rate, a bandwidth, a packet loss rate, a jitter rate, or a disorder rate.

Optionally, in a case where the first information includes the first measurement parameter, the first information may indicate performing a measurement corresponding to the first measurement parameter. In a case where the first information includes the selecting condition for a terminal device, the first information may indicate selecting an identification of a terminal device that satisfies the selecting condition for a terminal device. In a case where the first information includes the measurement behavior, the first information may indicate performing a measurement corresponding to the measurement behavior. In a case where the first information includes the reporting way, the first information may indicate reporting information by using the reporting way. Reported information may include at least one identification of at least one terminal device that is selected or chosen.

Optionally, the first measurement parameter may include one parameter. For example, in a case where the first measurement parameter includes the delay, the executing network element may perform a delay measurement based on the delay in the first information. For another example, in a case where the first measurement parameter includes the rate, the executing network element may perform a rate measurement based on the rate in the first information. Optionally, the executing network element may determine at least one of the rate, the bandwidth, the packet loss rate, the jitter rate, the disorder rate, etc., based on a data packet transmitted by the terminal device.

Optionally, the first measurement parameter may include multiple parameters. For example, in a case where the first measurement parameter includes the delay and the rate, the executing network element may perform the delay measurement and/or the rate measurement based on the delay and the rate in the first information. Exemplarily, the executing network element may perform the delay measurement on some terminal devices and perform the rate measurement on some other terminal devices; the terminal devices on which the delay measurement is performed and the terminal devices on which the rate measurement is performed may overlap, that is, there are certain terminal devices on which both the delay measurement and the rate measurement are performed.

The rate in the embodiments of the present disclosure may be referred to as a bit rate in some other embodiments. The bandwidth in the embodiments of the present disclosure may be referred to as a transmission bandwidth in some other embodiments.

Optionally, the first information may indicate to determine at least one identification of at least one terminal device corresponding to the measurement policy, and report the at least one identification of the at least one terminal device.

Optionally, in some embodiments, the measurement policy may be transmitted by the application server. In some other embodiments, the measurement policy may be generated or determined by the controlling network element, and the controlling network element may determine the measurement policy based on a measurement requirement transmitted by the application server. Optionally, the measurement policy may be transmitted by the application server to the PCF network element or the SMF network element.

Optionally, the application server may be referred to as an application function (AF) or an application function entity, in some other embodiments.

Optionally, the first measurement parameter may include a Quality of Service (QOS) parameter.

In the embodiments of the present disclosure, the controlling network element transmits the first information to the executing network element, and the first information includes the measurement policy; where the measurement policy includes at least one of: the first measurement parameter, the selecting condition for a terminal device, the measurement behavior, or the reporting way; the first measurement parameter includes at least one of: the delay, the rate, the bandwidth, the packet loss rate, the jitter rate, or the disorder rate. In this way, the executing network element obtains the measurement policy transmitted by the controlling network element, and thus can perform the measurement corresponding to the measurement policy, which improves the flexibility of measuring by the executing network element.

In some embodiments, the selecting condition for a terminal device includes at least one of:

- a terminal device in a connecting state within a specific time range;
- a terminal device within a specific area;
- a terminal device with a delay lower than a first threshold;
- one or more terminal devices with a lowest delay;
- a terminal device with a rate higher than or equal to a second threshold;
- one or more terminal devices with a highest rate;
- a terminal device with a bandwidth greater than or equal to a third threshold;
- one or more terminal devices with a largest bandwidth;
- a terminal device with a packet loss rate lower than a fourth threshold;
- one or more terminal devices with a lowest packet loss rate;
- a terminal device with a jitter rate lower than a fifth threshold;
- one or more terminal devices with a lowest jitter rate;
- a terminal device with a disorder rate lower than a sixth threshold; or
- one or more terminal devices with a lowest disorder rate.

Optionally, the delay may include at least one of: an uplink delay, a downlink delay, and a round-trip delay. In some embodiments, the delay may refer to a delay between the terminal device or the executing network element. In some other embodiments, the delay may refer to a delay between the terminal device and the access network device. In yet some other embodiments, the delay may refer to a delay between the executing network element and the access network device.

Optionally, the specific time range may correspond to a first duration, and the specific time range may be a time range between a starting moment before a current moment and spacing a first duration from the current moment and the current moment. For example, the executing network element may select a terminal device that is in the connecting state within the specific time range, from one or more identifications of one or more terminal devices to be selected.

Optionally, the specific area may be terminal devices within a coverage range of a specific access network device; the specific access network device may include one or more access network devices. Optionally, the specific area may be one or more specific administrative areas. In some embodiments, the first information may include an identification of the specific access network device and/or an identification of the administrative area, thereby enabling the controlling network element to determine terminal devices within the coverage range of the specific access network device and/or terminal devices within the administrative area.

Optionally, at least one of the first threshold to the sixth threshold may be preconfigured, or may be indicated in the first information. Optionally, the number of the one or more terminal devices may be preconfigured, or may be indicated in the first information.

In some embodiments, taking the delay as an example, if the selecting condition for a terminal device includes a terminal device with the delay lower than the first threshold, the executing network element determines latencies of candidate terminal devices, and determines at least one terminal device corresponding to the delay lower than the first threshold among the latencies of the candidate terminal devices, as a terminal device that satisfies the selecting condition for a terminal device, and then, the executing network element may report the at least one identification of the at least one terminal device. Optionally, the candidate terminal devices may include one or more terminal devices.

Optionally, the executing network element may preconfigure a target number of reported identifications of terminal devices, or the first information may indicate the target number of the reported identifications of terminal devices. In a case where the number of identifications of terminal devices that satisfy the selecting condition for a terminal device is greater than the target number, the target number of identifications of terminal devices may be arbitrarily selected from the identifications of the terminal devices that satisfy the selecting condition for a terminal device, or the target number of identifications of terminal devices may be selected from the identifications of the terminal devices that satisfy the selecting condition for a terminal device, according to a priority order of the first measurement parameter, and the target number of identifications of terminal devices are reported. In a case where the number of identifications of terminal devices that satisfy the selecting condition for a terminal device is less than or equal to the target number, the identifications of the terminal devices that satisfy the selecting condition for a terminal device are reported. The priority order may be preconfigured by the executing network element, or indicated by the first information.

In some embodiments, the measurement behavior includes one of:

- a measurement value of the first measurement parameter being a measurement value in a last time;
- a measurement value of the first measurement parameter being a statistical parameter of measurement values in last Q times, where the Q is greater than or equal to 2;
- a measurement value of the first measurement parameter being a statistical parameter of measurement values within a first time period, where the first time period is preconfigured, or is indicated in the first information.

Optionally, the executing network element may measure the first measurement parameter within a first specific time period, and determine the measurement value of the first measurement parameter as the measurement value in the last time. A starting moment of the first specific time period may be a moment at which the first information is received, or a moment at which the first information is processed completely, and a duration corresponding to the first specific time period may be a first specific duration. The first specific duration may be preconfigured by the executing network element or included in the first information.

Optionally, the executing network element may measure the first measurement parameter within a second specific time period, and determine a statistical parameter of the measurement values in the last Q times. A starting moment of the second specific time period may be a moment at which the first information is received, or a moment at which the first information is processed completely, and a duration corresponding to the second specific time period may be a second specific duration. The second specific duration may be preconfigured by the executing network element or included in the first information.

Optionally, the executing network element may measure according to a specified period within the first time period, and determine a statistical parameter of measurement values within the first time period. The specified period may be preconfigured by the executing network element or indicated in the first information.

Optionally, the statistical parameter may include at least one of: a maximum value, a minimum value, a mean value, a median, or a mode.

In some embodiments, the reporting way includes at least one of:

- the executing network element reporting at least one identification of at least one terminal device via a control plane network element;
- the executing network element reporting at least one identification of at least one terminal device via a user plane network element;
- the executing network element reporting at least one identification of at least one terminal device at a specific time;
- the executing network element reporting at least one identification of at least one terminal device periodically; or
- the executing network element in a set area reporting at least one identification of at least one terminal device.

The control plane network element may include at least one of: a PCF network element, an NEF network element, an NWDAF network element, an AMF network element, an SMF network element, or a UDM network element. The user plane network element may include a UPF network element and/or a local-network exposure function (Local-NEF, L-NEF).

In some embodiments, the control plane network element may be the same network element as the controlling network element. For example, the control plane network element and the controlling network element are both the SMF network elements, or the PCF network element, or a combination of the SMF network element and the PCF network element. In some other embodiments, the control plane network element may be at least partially different from the controlling network element.

In some embodiments, the specific time may be a time spacing a set duration from receiving the first information. In this case, the specific time may refer to one time. In some other embodiments, the specific time may be multiple times after receiving the first information, and the executing network element reports at least one identification of at least one terminal device once at each of the multiple times. Interval durations between the multiple times may be the same or different. The executing network element, at each two adjacent times of the multiple times, determines at least one identification of at least one terminal device that satisfies the measurement policy within each two adjacent times.

In some embodiments, the reporting way may indicate a reporting period for periodic reporting, and in this way, the executing network element may report at least one identification of at least one terminal device once in each reporting period (which may be preconfigured by the controlling network element or indicated in the first information). Optionally, the at least one identification of the at least one terminal device reported at different times may be the same or different.

Optionally, the set area may be a coverage area of a certain or more access network devices, or a certain or more administrative areas, or an area with certain scenes (e.g., a park space, a restaurant space, an office space, etc.). The executing network element may be within the set area, and in some embodiments, an identification of the set area may have a one-to-many mapping relationship with the executing network element, and the reporting way may include the identification of the set area, and thus the executing network element corresponding to the identification of the set area reports the at least one identification of the at least one terminal device.

In some embodiments, the first information also includes a group message corresponding to a first group. Optionally, the first group includes one or more groups.

Optionally, the group message corresponding to the first group may be transmitted by the application server to the controlling network element. For example, the group message may be transmitted by the application server to the PCF network element or the SMF network element.

In some embodiments, the group message corresponding to the first group includes at least one of: an identification of the first group, all or a portion of identifications of terminal devices in the first group, or attribute information of the first group.

Optionally, the identification of the first group may include a name of the first group. For example, the name of the first group may be a delay-measured group, a rate-measured group, or the like. Optionally, the identification of the first group may be at least one number consisting of binary, octal, decimal or hexadecimal.

Optionally, a portion of identifications of terminal devices in the first group may be arbitrarily determined from all terminal devices in the first group, or a portion of identifications of terminal devices in the first group may be selected from all terminal devices in the first group based on a preset condition. Optionally, a portion of identifications of terminal devices in the first group may be a preset number of identifications of terminal devices.

Optionally, the attribute information of the group includes at least one of: location information of the group, quantity information of terminal devices in the group, or user attribute information corresponding to terminal devices in the group. Herein, the user attribute information may include at least one of: an age, a gender, an occupation, or a health state. For example, the user attribute information may include users' ages between 20 and 60 years old.

Optionally, in a case where the group message corresponding to the first group includes the identification of the first group and/or the attribute information of the first group, the executing network element may determine identifications of terminal devices corresponding to the identification of the first group and/or the attribute information of the first group, and determine the determined identifications of terminal devices as identifications of candidate terminal devices, thereby enabling the executing network element to select at least one identification of at least one terminal device from the identifications of the candidate terminal devices.

Optionally, in some embodiments, the controlling network element may directly receive all or a portion of identifications of terminal devices in the first group transmitted by the application server. In some other embodiments, the controlling network element receives the identification of the first group and/or the attribute information of the first group transmitted by the application server, and the controlling network element may determine identifications of terminal devices corresponding to the identification of the first group and/or the attribute information of the first group, and determine the determined identifications of terminal devices as all or a portion of identifications of terminal devices in the first group.

In this way, the controlling network element transmits the group message corresponding to the first group to the executing network element, and thus the executing network element may select at least one identification of at least one terminal device that satisfies the requirement from the identifications of the candidate terminal devices corresponding to the group message, based on the group message. For example, an identification of a terminal device that satisfies the measurement policy is selected.

In some embodiments, the first information further includes: an identification of a terminal device (for example, M identifications of terminal devices, where M is greater than or equal to 1) that transmits joining of the first group to the controlling network element and/or an identification of a terminal device (for example, N identifications of terminal devices, where Nis greater than or equal to 1) consenting to measure.

Optionally, the at least one identification of the at least one terminal device is determined from the M identifications of terminal devices or the N identifications of terminal devices, or is determined from an intersection set or a union set of the M identifications of terminal devices and the N identifications of terminal devices. Optionally, the M identifications of terminal devices, or the N identifications of terminal devices, or the intersection set or the union set of the M identifications of terminal devices and the N identifications of terminal devices, may be identifications of candidate terminal devices.

In some embodiments, the M identifications of terminal devices are all or a portion of identifications of terminal devices that transmit joining of the first group to the controlling network element. Exemplarily, the M identifications of terminal devices may be all or a portion of identifications of terminal devices that transmit joining of the first group to the controlling network element, within a set time range and/or a set area range. Optionally, there may be M pieces of information of transmitting the joining of the first group to the controlling network element (e.g., the SMF network element or the PCF network element).

In some embodiments, the identification of the terminal device consenting to measure is included in identifications of terminal devices that transmit consenting-to-measure to the controlling network element, or is obtained by the controlling network element from a unified data management (UDM) network element and/or a unified data repository (UDR) network element. Optionally, there may be N terminal devices that may transmit the consenting-to-measure to the controlling network element (e.g., the SMF network element or the PCF network element). Optionally, the identification of the terminal device consenting to measure may be an identification of a terminal device that transmits the consenting-to-measure to the controlling network element, or may be a subset of identifications of terminal devices that transmit the consenting-to-measure to the controlling network element.

In some embodiments, the identification of the terminal device consenting to measure is an identification of a terminal device with the first measurement parameter in the measurement policy included in a second measurement parameter consented to measure, among identifications of terminal devices that transmit consenting-to-measure to the controlling network element, and/or an identification of a terminal device consenting to report a measurement value, and/or an identification of a terminal device consenting to report to an application server.

Optionally, in some embodiments, the controlling network element (e.g., the SMF network element or the PCF network element) may select the identification of the terminal device consenting to measure, from all identifications of terminal devices that transmit the consenting-to-measure to the controlling network element.

In some embodiments, request information may be transmitted by the terminal device to the controlling network element. For example, in some embodiments, the method further includes: receiving, by the controlling network element, the request information transmitted by a candidate terminal device or an application server; where the request information indicates that: the candidate terminal device joins the first group and/or the candidate terminal device consents to measure.

Optionally, the identification of the terminal device joining the first group and/or the identification of the terminal device consenting to measure are determined from the request information.

Optionally, the controlling network element may determine the identification of the terminal device joining the first group and/or the identification of the terminal device consenting to measure based on the received request information. In this way, the controlling network element may, by the first information, indicate: the identification of the terminal device joining the first group and/or the identification of the terminal device consenting to measure.

In some other embodiments, the request information may be transmitted by the terminal device to the executing network element. For example, in some embodiments, the method further includes: receiving, by the executing network element, the request information transmitted by the candidate terminal device or the application server; the request information indicates that: the candidate terminal device joins the first group and/or the candidate terminal device consents to measure.

Optionally, the executing network element determines the at least one identification of the at least one terminal device that satisfies the measurement policy, from the identification of the terminal device joining the first group, or the identification of the terminal device consenting to measure, or an intersection set or a union set of the identification of the terminal device joining the first group and the identification of the terminal device consenting to measure.

Optionally, the executing network element may determine the identification of the terminal device joining the first group and/or the identification of the terminal device consenting to measure based on the received request information. In this way, the executing network element may determine the identification of the terminal device joining the first group and/or the identification of the terminal device consenting to measure by itself, without the need for the controlling network element to indicate them in the first information.

Figure 7:
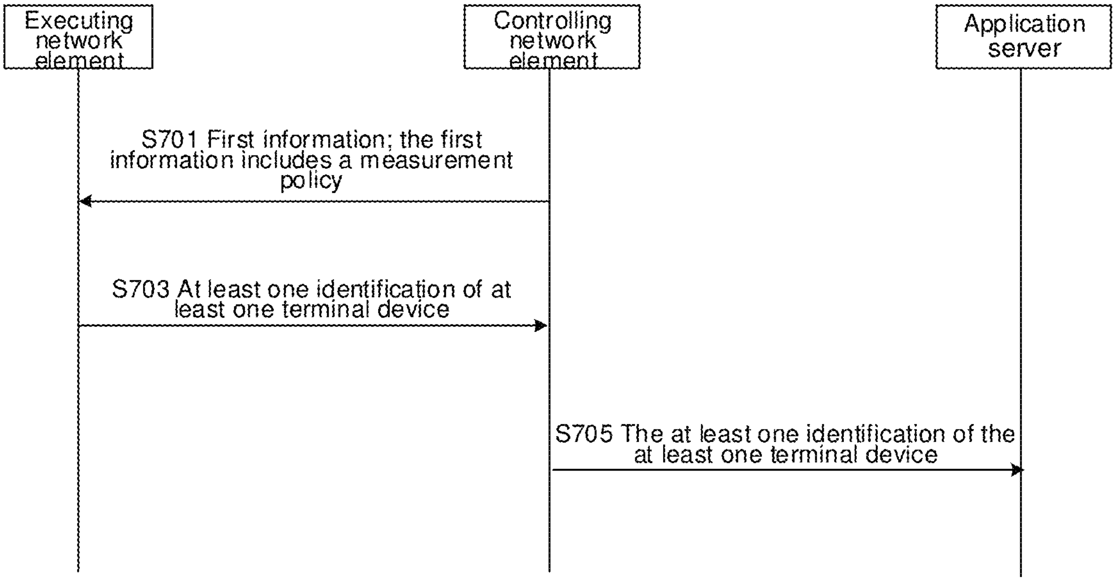
FIG. 7 is a flow schematic diagram of another communication method provided in an embodiment of the present disclosure.

FIG. 7 is a flow schematic diagram of another communication method provided in an embodiment of the present disclosure, and as shown in FIG. 7, the method includes the following steps.

S701, a controlling network element transmits first information to an executing network element; the executing network element receives the first information transmitted by the controlling network element; the first information includes a measurement policy.

S703, the executing network element transmits at least one identification of at least one terminal device to the controlling network element; the controlling network element receives the at least one identification of the at least one terminal device transmitted by the executing network element; the at least one identification of the at least one terminal device is determined based on the first information.

S705, the controlling network element transmits the at least one identification of the at least one terminal device to an application server.

In some embodiments, the first information is included in a session establishment request, or included in a session modification/update request, or transmitted via separate signaling.

In some embodiments, the controlling network element receiving the at least one identification of the at least one terminal device transmitted by the executing network element, includes: the controlling network element receiving a session establishment reply or a session modification/update reply or separate signaling transmitted by the executing network element, and the session establishment reply or the session modification/update reply or the separate signaling includes the at least one identification of the at least one terminal device.

In some embodiments, the executing network element transmitting the at least one identification of the at least one terminal device to the controlling network element, includes: the executing network element transmitting a session establishment reply or a session modification/update reply or separate signaling to the controlling network element, and the session establishment reply or the session modification/update reply or the separate signaling includes the at least one identification of the at least one terminal device.

Figure 8:
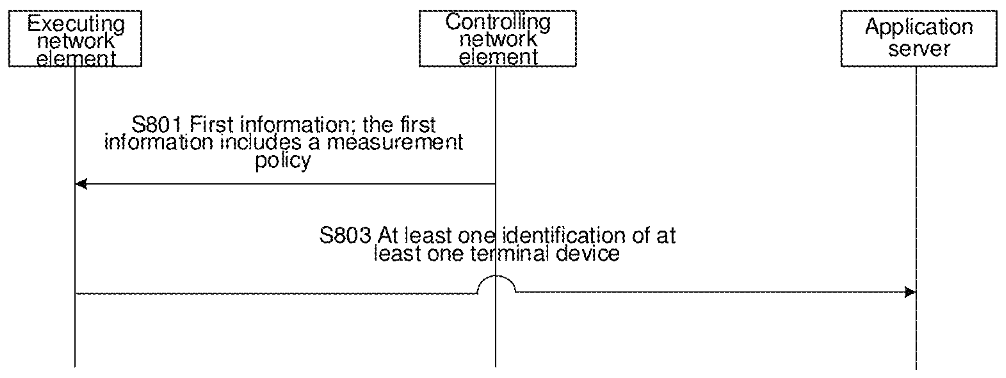
FIG. 8 is a flow schematic diagram of yet another communication method provided in an embodiment of the present disclosure.

FIG. 8 is a flow schematic diagram of yet another communication method provided in an embodiment of the present disclosure, and as shown in FIG. 8, the method includes the following steps.

S801, a controlling network element transmits first information to an executing network element; the executing network element receives the first information transmitted by the controlling network element; the first information includes a measurement policy.

S803, the executing network element transmits at least one identification of at least one terminal device to an application server.

In this embodiment, the executing network element directly transmits the at least one identification of the at least one terminal device to the application server, without forwarding via the controlling network element. The executing network element directly transmitting the at least one identification of the at least one terminal device to the application server, may be understood as the executing network element reporting the at least one identification of the at least one terminal device via a user plane network element.

In some embodiments, the controlling network element includes at least one of: a session management function (SMF) network element or a policy control function (PCF) network element.

In some embodiments, the executing network element may include a data plane network element. For example, the executing network element includes: a user plane function (UPF) network element and/or a local-network exposure function (L-NEF) network element.

Figure 9:
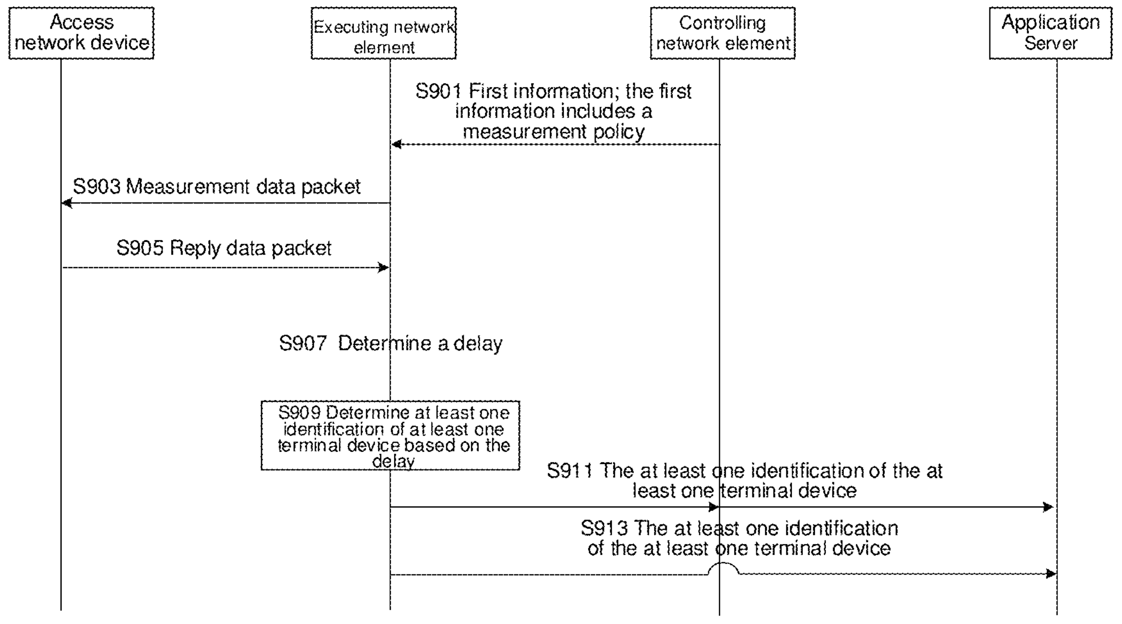
FIG. 9 is a flow schematic diagram of further another communication method provided in an embodiment of the present disclosure.

FIG. 9 is a flow schematic diagram of further another a communication method provided in an embodiment of the present disclosure, and as shown in FIG. 9, the method includes the following steps.

S901, a controlling network element transmits first information to an executing network element; the executing network element receives the first information transmitted by the controlling network element; the first information includes a measurement policy.

S903, in a case where the first information includes a delay, the executing network element transmits a measurement data packet to an access network device.

S905, the executing network element receives a reply data packet transmitted by the access network device.

S907, the executing network element determines a delay based on a time of transmitting the measurement data packet, a time of receiving the reply data packet, and time information carried in the reply data packet.

Optionally, the time may include a timestamp. Optionally, the delay determined by the executing network element may include at least one of: an uplink delay, a downlink delay, or a round-trip delay.

Optionally, the time information carried in the reply data packet in S907 may include at least one of: a time at which the access network device receives the measurement data packet, or a time at which the access network device transmits the reply data packet.

In some embodiments, the executing network element determines the delay (the delay is a round-trip delay) based on the time at which the executing network element transmits the measurement data packet and the time at which the executing network element receives the reply data packet. In this case, the uplink delay or the downlink delay may be a half of the round-trip delay, and the reply data packet may carry the time or not.

In some other embodiments, the executing network element determines the delay (the delay is the uplink delay) based on the time at which the executing network element transmits the measurement data packet, and the time at which the access network device receives the measurement data packet, carried in the reply data packet. In this case, the downlink delay may be the same as the uplink delay, and the round-trip delay may be twice of the uplink delay.

In yet some other embodiments, the executing network element determines the delay (the delay is a downlink delay) based on the time at which the executing network element receives the reply data packet, and the time at which the access network device transmits the reply data packet, carried in the reply data packet. In this case, the uplink delay may be the same as the downlink delay, and the round-trip delay may be twice of the downlink delay.

In further some other embodiments, the executing network element determines the delay based on the time at which the access network device receives the measurement data packet and the time at which the access network device transmits the reply data packet, which are carried in the reply data packet.

In some other embodiments, in order to improve the accuracy of the determined round-trip delay, the executing network element determines the uplink delay based on the time at which the executing network element transmits the measurement data packet, and the time at which the access network device receives the measurement data packet, carried by the reply data packet; the executing network element determines the downlink delay based on the time at which the executing network element receives the reply data packet, and the time at which the access network device transmits the reply data packet, carried by the reply data packet; and determines the round-trip delay based on the uplink delay and the downlink delay.

S909, the executing network element determines at least one identification of at least one terminal device based on the delay.

Optionally, the executing network element may determine the at least one identification of the at least one terminal device based on at least one of the uplink delay, the downlink delay, or the round-trip delay.

In some embodiments, after S909, S911 or S913 may be performed.

S911, the executing network element transmits the at least one identification of the at least one terminal device to the controlling network element, and the controlling network element transmits the at least one identification of the at least one terminal device to the application server.

S913, the executing network element transmits the at least one identification of the at least one terminal device to the application server.

Figure 10:
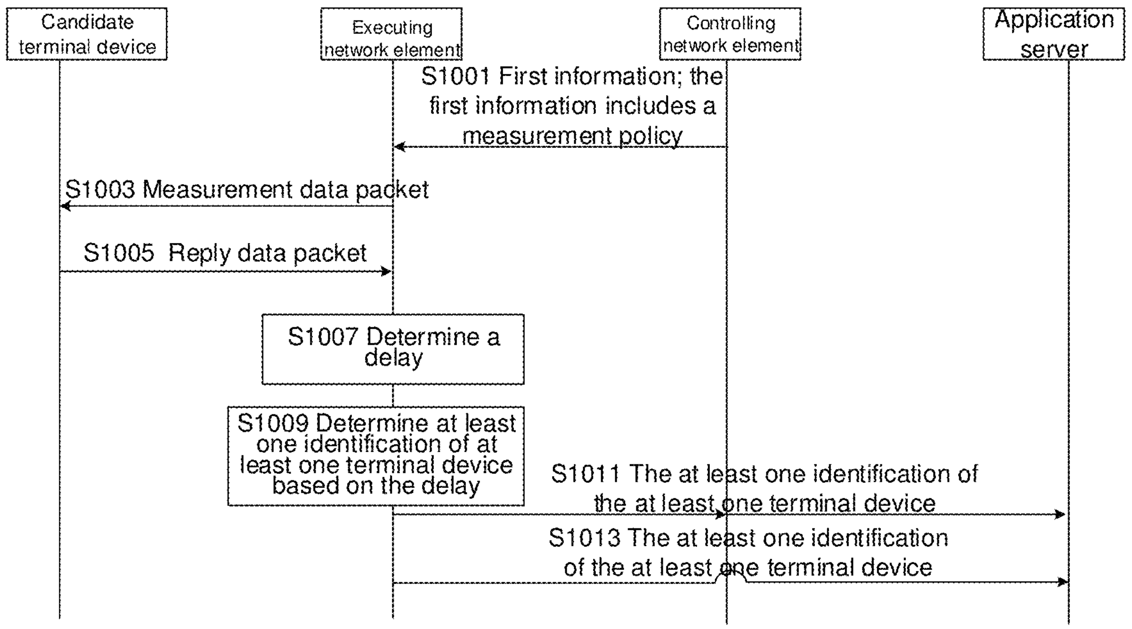
FIG. 10 is a flow schematic diagram of a communication method provided in another embodiment of the present disclosure.

FIG. 10 is a flow diagram of a communication method provided in another embodiment of the present disclosure, and as shown in FIG. 10, the method includes the following steps.

S1001, a controlling network element transmits first information to an executing network element; the executing network element receives the first information transmitted by the controlling network element; the first information includes a measurement policy.

S1003, in a case where the first information includes the delay, the executing network element transmits a measurement data packet to a candidate terminal device.

The executing network element may transmit the measurement data packet to the candidate terminal device via an access network device.

S1005, the executing network element receives a reply data packet transmitted by the candidate terminal device.

The executing network element may receive the reply data packet transmitted by the candidate terminal device via the access network device.

S1007, the executing network element determines a delay based on a time at which the measurement data packet is transmitted, a time at which the reply data packet is received, and time information carried in the reply data packet.

Optionally, in some embodiments, in a case where the access network device forwards the measurement data packet and/or the reply data packet, the access network device may mark a time when receiving and/or a time when transmitting in the measurement data packet and/or the reply data packet, or the access network device does not mark any time in the measurement data packet and/or the reply data packet and only performs a function of data forwarding.

Optionally, the reply data packet may carry the time at which the measurement data packet is received and/or the time at which the reply data packet is transmitted. Herein, the time at which the measurement data packet is received may include at least one of: a time at which the access network device receives the measurement data packet, or a time at which the candidate terminal device receives the measurement data packet. The time at which the reply data packet is transmitted may include at least one of: a time at which the access network device transmits the reply data packet, or a time at which the candidate terminal device transmits the reply data packet.

Optionally, when the executing network element determines the delay, the time at which the access network device transmits the measurement data packet, the time at which the candidate terminal device receives the measurement data packet, the time at which the access network device receives the reply data packet, and the time at which the candidate terminal device transmits the reply data packet may be used to determine a delay between the candidate terminal device and the access network device (the delay is a round-trip delay), or, the time at which the access network device transmits the measurement data packet and the time at which the candidate terminal device receives the measurement data packet may be used to determine the delay between the candidate terminal device and the access network device (the delay is a downlink delay), or, the time at which the access network device receives the reply packet and the time at which the candidate terminal device transmits the reply packet may be used to determine the delay between the candidate terminal device and the access network device (the delay is an uplink delay), or, a way listed in S907 may be used to determine the delay.

S1009, the executing network element determines at least one identification of at least one terminal device based on the delay.

Optionally, the executing network element may determine the at least one identification of the at least one terminal device based on at least one of the uplink delay, the downlink delay, or the round-trip delay.

In some embodiments, after S1009, S1011 or S1013 may be performed.

S1011, the executing network element transmits the at least one identification of the at least one terminal device to the controlling network element, and the controlling network element transmits the at least one identification of the at least one terminal device to an application server.

S1013, the executing network element transmits the at least one identification of the at least one terminal device to the application server.

Optionally, in the embodiments corresponding to FIG. 9 and FIG. 10, the executing network element determines the delay based on at least one or at least two of:

- the time at which the measurement data packet is transmitted, the time at which the reply data packet is received, and one or more pieces of information in the time information carried in the reply data packet.

In the embodiments corresponding to FIG. 9 and FIG. 10, the time information includes at least one of:

- a time point at which the measurement data packet and/or the reply data packet is received by the core network node, the access network device, and/or the candidate terminal device;
- a time point at which the measurement data packet and/or the reply data packet is transmitted by the core network node, the access network device, and/or the candidate terminal device;
- a data transmission latency of the access network device and the candidate terminal device; or
- a data transmission latency of the access network device and the core network node.

Exemplarily, one piece of information in the time information may be a time point at which the measurement data packet is received by the access network device, or one piece of information in the time information may be an data uplink transmission latency between the access network device and the candidate terminal device, etc., which are not listed one by one in the embodiments of the present disclosure.

Optionally, one piece of information in the time information may be a time value of one or more time values (e.g., time points and/or latencies) included in the time information.

Optionally, the core network node may be the above-mentioned core network device. Optionally, the time point may include a timestamp.

Optionally, a transmission latency may include an uplink transmission latency, a downlink transmission latency and/or a round-trip transmission latency.

Optionally, in S907 and/or S1007, in a case where the time information includes the data transmission latency of the access network device and the candidate terminal device, the executing network element may determine the data transmission latency of the access network device and the candidate terminal device as the delay.

Optionally, in S907 and/or S1007, in a case where the time information includes the data transmission latency of the access network device and the core network node, the executing network element may determine the data transmission latency of the access network device and the core network node as the delay.

Optionally, in S907 and/or S1007, in a case where the time information includes the data transmission latency of the access network device and the candidate terminal device, and the data transmission latency of the access network device and the core network node, the executing network element may determine the delay based on one or both of these two transmission latencies.

It needs to be noted that, although in the embodiments of the present disclosure, multiple methods for determining the delay are listed, the present disclosure is not limited thereto, and any method for determining the delay based on the time at which the measurement data packet is transmitted, the time at which the reply data packet is received, and the time information carried in the reply data packet is within the protection scope of the present disclosure.

In some embodiments, a packet header of the measurement data packet carries a first indication; the first indication is used to indicate a measurement delay.

Figure 11:
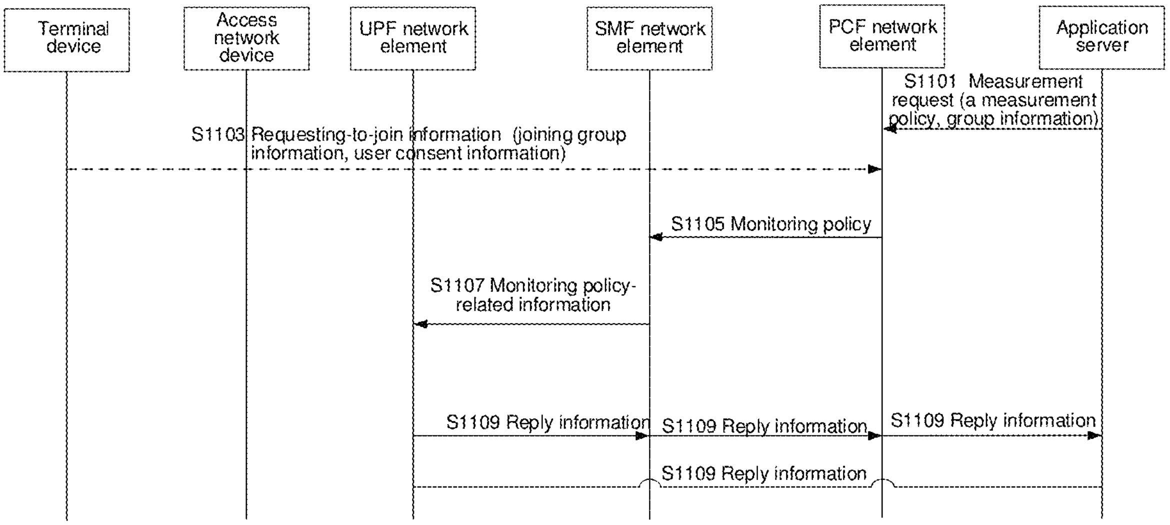
FIG. 11 is a flow schematic diagram of a communication method provided in yet another embodiment of the present disclosure.

FIG. 11 is a flow schematic diagram of a communication method provided in yet another embodiment of the present disclosure, and as shown in FIG. 11, a basic idea of the embodiments shown in FIG. 11 is that: a third party (such as an application server, and the third party may also be referred to as a third-party device in some other embodiments) may transmit a measurement request to a 5GS (the 5GS refers to a 5G system, which is a collective term of all 5G network elements, including an access network device and a core network device). At the same time, a terminal device may transmit a request message to the network to apply for joining a certain group (such as a group performing federated learning), and at the same time, may carry indication information about whether a user consents to perform measurement. The network performs the measurement based on the request from the third party and/or the terminal device, and reports information (such as a list of terminal device IDs) that satisfies a condition to the third party as needed. Specifically, the method includes the following steps.

S1101, an application server transmits a measurement request to a PCF network element; where the measurement request includes a measurement policy and/or group information.

The third party (the application server) transmits the measurement request to the policy management function network element. Herein, the third party (the application server) may transmit the request message to the 5G core network element either directly or by forwarding the request message via a network capability exposure network element (such as a NEF), to ensure the relevant security. The measurement request may include the following two parameters.

1) A group message (which is an optional parameter): the group message indicates a group specifically involved in applying for measurement/reporting, and may include an identification of a group and/or a list of UE IDs corresponding to the group.

2) A measurement policy: it is used to determine a measurement method and report a UE ID that satisfies a measurement condition as required, and the measurement policy specifically includes at least one of the following.

A measurement content: may be whether one or more parameters in QoS parameters satisfy a condition, and the QoS parameters may include a data delay (e.g., packet delay budget (PDB)) (or referred to as a latency) parameter, and may also be a rate parameter.

A selecting condition: may be a number of UEs that satisfy a QoS condition requirement at a specific time and/or a specific location for this group, such as selecting terminal devices that satisfy the measured PDB<=10 ms, or selecting five terminal devices with the smallest measured PDB, or selecting five terminal devices with the largest measured bit rate, etc, and various selecting conditions herein may be mixed to use for selecting.

In addition, for a certain separate measurement condition, a specific measurement behavior for the measurement may be limited, for example, whether the measured PDB value takes into account only a result measurement in the last time, or an average of the last 3 measurement results, or an average of measurement results within the last 10 seconds, etc, and for another example, whether the bit rate takes into account an average of measurement results within the last 5 seconds, or an average of measurement results at the last three time points, etc.

A reporting way: a result (which here mainly refers to the list of UE IDs that satisfy the condition) selected by the measurement content and the selecting condition may be reported to the third party (such as the application server) via a control plane network element (such as the PCF) or a user plane network element (such as the UPF). Here, it is necessary to configure a time of the reporting condition (including, reporting information at a specific time point or periodically) and/or a location condition for reporting (such as a measurement selected result within a certain range).

S1103, the terminal device transmits requesting-to-join information to the PCF network element. The requesting-to-join information includes: joining group information or user consent information.

Optionally, the terminal device may transmit the requesting-to-join information via the access network device, the UPF network element, and the SMF network element in sequence, to the PCF network element.

In S1103, the terminal device requests to join the group and/or provides the user consent information. This step may be completed together with signaling initiated by the terminal device when the terminal device establishes or modifies the PDU session, which is not limited thereto.

1) The joining group: this parameter may include an identification of requesting to join a group and/or an identification of a specific group to be joined.

2) The user consent: this parameter may include whether a user consents to measure, and which parameters (such as which QoS-related parameters) the user consents to measure, and whether the user consents to report information related to measurement results (such as a result after being selected by the condition) to the third party, and furthermore, the parameter may also specify which third party to consent to report to (such as consent to report to an OTT-1 (Over The Top-1), but not to an OTT-2).

Optionally, all or a portion of parameters consented by the user may also be obtained by the core network control plane network element via a network element such as the UDM/UDR, etc., that stores subscription information or policy information (for example, in a process of the PDU session establishment or modification, the all or the portion of parameters may be provided as the subscription information from the UDM, or obtained as a portion of the policy information by the PCF looking up the UDR).

S1105, the PCF network element generates a monitoring policy based on the measurement policy and/or the group information, and the joining group information and/or the user consent information, and transmits the monitoring policy to the SMF network element.

In some embodiments, the monitoring policy may be included in a Policy and Charging Control (PCC) rule.

In S1105, the PCF network element transmits the monitoring policy to the SMF network element, the monitoring policy is generated based on the measurement policy and/or the group information in the received measurement request message, that is, the monitoring policy may reflect a content corresponding to the measurement policy and/or the group information, and at the same time, if the PCF network element has received joining group and user consent-related parameters in step S1103 or itself has obtained the related parameters in interaction with the UDM/UDR, the related parameters may also be reflected as a part of the monitoring policy and transmitted to the SMF network element.

Optionally, the PCF network element here may convert the received content of the measurement request into a part of the PCC rule and transmit it to the SMF network element, or may also generate the monitoring policy to transmit to the SMF network element separately, or in any form not limited thereto.

S1107, the SMF network element transmits monitoring policy-related information to the UPF network element.

The monitoring policy-related information may be determined based on the monitoring policy. In some embodiments, the monitoring policy may be directly determined as the monitoring policy-related information. In some other embodiments, it may be obtained by performing format conversion and/or content conversion on the monitoring policy. In some implementations, the monitoring policy-related information and the monitoring policy both include the measurement policy and/or the group information, and include the joining group information and/or the user consent information.

Optionally, the monitoring policy-related information may be the first information in the above embodiments.

Optionally, the monitoring policy-related information may be included in session information, for example, included in QoS flow establishment information, or included in QoS flow update information.

In S1107, the SMF network element interacts with the UPF network element according to the monitoring policy transmitted by the PCF network element, and requests the UPF network element to perform the monitoring policy. Optionally, as a possibility, the SMF network element may obtain the joining group and user consent-related information by the step S1103 or by interacting with the UDM/UDR. That is, the SMF network element may acquire the requesting-to-join information transmitted by the terminal device, or acquire the information related to the joining group information and/or the user consent information from the UDM/UDR. Optionally, the joining group and user consent-related information may include an identification of a terminal device for joining group and user consent.

S1109, the UPF network element transmits reply information to the SMF network element, so that the SMF network element transmits reply information to the application server, or the UPF network element transmits reply information to the application server.

Optionally, the reply information may include at least one identification of at least one terminal device.

Optionally, the reply information may be included in the session information, for example, included in QoS flow establishment reply information, or included in QoS flow update reply information.

Optionally, in a case where the SMF network element receives the reply information, the SMF network element may transmit the reply information to the PCF network element, so that the PCF network element transmits reply information to the application server.

In some other embodiments, the step S1103 may not be performed, and the PCF network element may generate the monitoring policy based on the measurement policy and/or the group information. In this embodiment, the monitoring policy-related information and the monitoring policy both include the measurement policy and/or the group information.

The UPF network element would select a UE ID that satisfies the condition as required by measuring the QoS parameters, and transmit the UE ID to the third party or other network elements of the 5G network (such as the SMF network element/the PCF network element/the AMF network element), etc., timely. A specific implementation may refer to the following embodiments.

Figure 12:
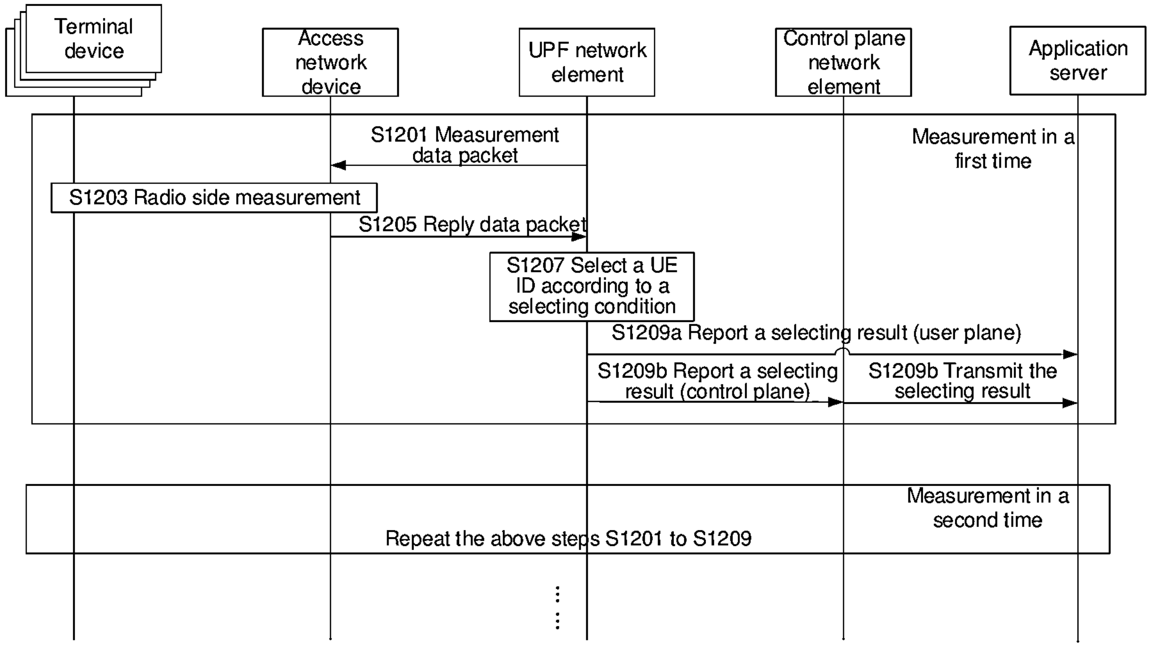
FIG. 12 is a flow schematic diagram of reporting a selected result provided in an embodiment of the present disclosure.

FIG. 12 is a flow schematic diagram of reporting a selected result provided in an embodiment of the present disclosure, and as shown in FIG. 12, the method includes the following steps.

S1201, a UPF network element transmits a measurement data packet to an access network device.

S1203, the access network device performs radio side measurement.

A method of the radio side measurement may include: transmitting, by the access network device, second information to a terminal device, where the second information indicates the radio measurement; and transmitting, by the terminal device, third information to the access network device, where the third information may be feedback information for the second information.

S1205, the access network device transmits a reply data packet to the UPF network element.

The UPF network element may be based on the configuration (such as the monitoring policy-related information) from the control plane network element (such as the SMF) in FIG. 11, and the UPF network element may transmit the measurement data packet to multiple terminal devices. The data packet may be a GTP-U user plane data packet, and a first indication is carried in a packet header to indicate that the data packet is used for measuring a delay. After receiving the data packet, the base station (RAN) node (i.e., the access network device) starts a measurement way for an air interface end and carries a measurement result to the UPF network element by the reply data packet in the step S1205, and at the same time, in the step 1205, the access network device may also transmit a timestamp-1 generated when receiving in the step 1201 and/or a timestamp-2 generated in the step S1205, to the UPF, and the UPF determines an uplink delay and/or a downlink delay according to the timestamp-1 and the timestamp-2 in combination with a timestamp in the step S1201 and a timestamp when receiving the data packet of the step S1205.

Optionally, a measurement step for the step S1205 is basically the prior art, and is only an example herein. That is, the prior art may already realize real-time measurement for a user plane delay.

Optionally, the access network device may transmit a message to the terminal device, and the access network device, after receiving a reply message for the message, transmits a reply data packet to the UPF network element.

S1207, the UPF network element selects a UE ID according to a selecting condition.

After S1207, a step S1209*a* or S1209*b* may be performed.

S1209*a*, the UPF network element directly reports a selected result to the application server.

The selected result may include a selected UE ID.

In this way, the UPF network element reports the selected result to the application server via the user plane.

S1209*b*, the UPF network element reports the selected result to a control plane network element, and the control plane network element reports the selected result to the application server.

The above steps S1201 to S1209 are steps for measurement in a first time, and after S1209*a* or S1209*b*, the steps S1201 to S1209 may be repeated to perform steps for measurement in a second time, thereby implementing the measurement for multiple times.

In the implementation, steps of S1201 to S1207 and S1209*a* all occur at the user plane, and S1209*b* is the result being transmitted from the user plane network element to the control plane network element, and then transmitted to the application server. Optionally, in the step S1209*a* or S1209*b*, the message may be transmitted to the application server via the network exposure function (NEF).

Figure 13:
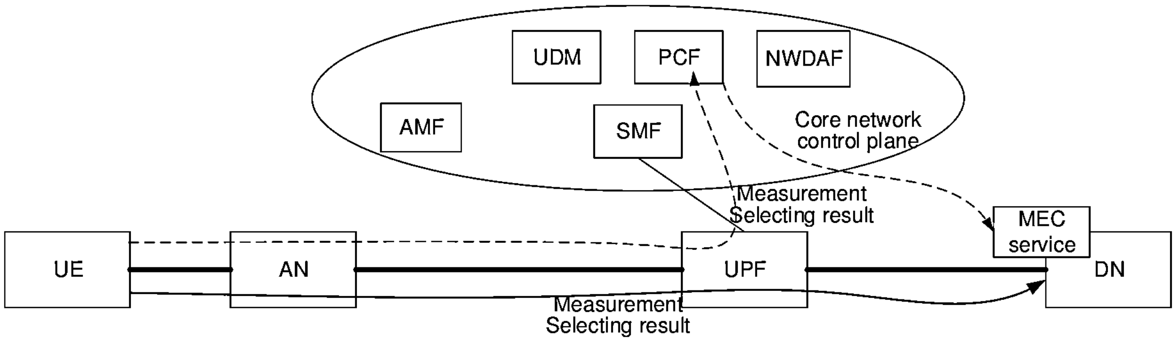
FIG. 13 is a schematic diagram of reporting a selected result to an application server provided in an embodiment of the present disclosure.

FIG. 13 is a schematic diagram of reporting a selected result to an application server provided in an embodiment of the present disclosure, and as shown in FIG. 13, in a case where the UPF network element obtains the selected result (also called as a measurement selected result, and the selected result includes an identification of a terminal device that satisfies the measurement policy), the UPF network element may report the selected result to the application server via the user plane (for example, as shown by solid lines in FIG. 13), or may report the selected result to the application server via the control plane (for example, as shown by dotted lines in FIG. 13). In a case of reporting the selected result to the application server via the control plane, the selected result may be reported to the application server via the control plane network element, and the control plane network element may include at least one of: the PCF network element, the NWDAF network element, the AMF network element, the SMF network element, the UDM network element, etc. In some embodiments, the UPF network element may report the selected result to the application server via the control plane network element or a multi-access Mobile Edge Computing (MEC) service. In FIG. 13, the identification of the terminal device (UE) may be transmitted to the UPF network element via the access network (AN) device, so that the UPF transmits the measurement selected result to the DN via the core network control plane network element, or may transmit the measurement selected result to the DN directly.

Figure 14:
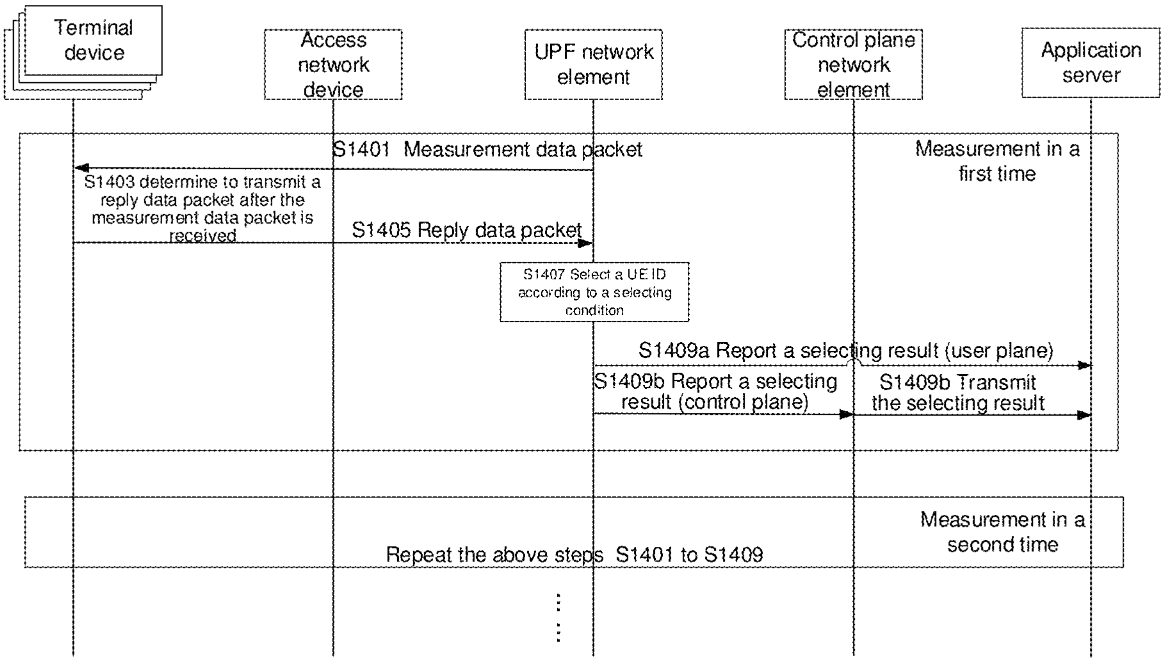
FIG. 14 is another flow schematic diagram of reporting a selected result provided in an embodiment of the present disclosure.

FIG. 14 is another flow schematic diagram of reporting a selected result provided in an embodiment of the present disclosure, and in FIG. 14, a delay is measured between a UPF network element and a terminal device, without the influence of an access network device. As shown in FIG. 14, the method includes the following steps.

S1401, the UPF network element transmits a measurement data packet to the terminal device.

The UPF network element may transmit a triggering measurement data packet (carrying a first indication) to multiple terminal devices according to the configuration of the control plane network element, and may carry a timestamp-1 (timestamp-1 when transmitting), and the RAN node forwards the data packet normally without additional operations.

S1403, the terminal device determines to transmit a reply data packet after the measurement data packet is received.

S1405, the terminal device transmits the reply data packet to the UPF network element.

The terminal device, after receiving it, learns that the data packet is the measurement data packet according to the "first indication" and returns the reply data packet. The terminal device may calculate a downlink delay according to a timestamp-1 and a moment at which the measurement data packet is received, and at the same time, may return a "measurement reply data packet", and may carry a timestamp-2 corresponding to the transmission of the data packet by the UE, in the measurement reply data packet, and the UPF, receiving the reply data packet, may obtain an uplink delay according to the received reply data packet and the corresponding time when receiving.

Optionally, the terminal device here may not perform calculation for any timestamp and/or delay, and may only reply an uplink measurement reply data packet after receiving a downlink measurement data packet, and the UPF may obtain a total round-trip delay by performing a subtraction operation on time points corresponding to the transmitted downlink data packet and the received uplink data packet respectively, and may divide the total round-trip delay by 2 to obtain an estimated one-direction delay.

S1407, the UPF network element selects a UE ID according to a selecting condition.

After S1407, a step S1409*a* or S1409*b* may be performed.

S1409*a*, the UPF network element directly reports a selected result to the application server.

S1409*b*, the UPF network element reports the selected result to the control plane network element, and the control plane network element reports the selected result to the application server.

The above steps S1401 to S1409 are steps for measurement in a first time, and after S1409*a* or S1409*b*, the steps S1401 to S1409 may be repeated to perform steps for measurement in a second time, thereby implementing the measurement for multiple times.

In the implementation, steps S1401 to S1407 and S1409*a* all occur at the user plane, and S1409*b* is the result being transmitted from the user plane network element to the control plane network element, and then transmitted to the application server. Optionally, in the step S1409*a* or S1409*b*, the message may be transmitted to the application server via the network exposure function (NEF).

The embodiments of the present disclosure implement a method for selecting according to the condition and reporting the selected UE to the third party (such as the application server). It can make full use of the existing process and mechanism, and quickly report information customized as required, to the third party, by the enhanced policy configuration and the local information exposure capability. In the embodiment corresponding to FIG. 14, the measurement method in the embodiments of the present disclosure does not require additional influence of the RAN node, has little impact on the terminal device, and has a lower requirement for clock synchronization, so it is simple to implement.

It needs to be noted that the embodiments of the present disclosure not only include the measurement for the delay and the related selecting in the embodiments corresponding to FIG. 12 and FIG. 14, but may also report useful information to the application server by the measurement for other related parameters (such as the QoS, etc.) and the selecting. The information reporting involved in the embodiments of the present disclosure may be provided not only to the third party (including a third-party application server or a terminal device application), but also may be provided to a operator's self-operated service (including an application server or a terminal device application of the self-operated service). The embodiments of the present disclosure are not limited to being used in the 5G network, and the same mechanism may also be used in the 4G or future networks.

The preferred embodiments of the present disclosure are described in detail above in combination with the accompanying drawings. However, the present disclosure is not limited to specific details in the above embodiments. Within a range of a technical conception of the present disclosure, a variety of simple modifications may be made to the technical solutions of the present disclosure, and these simple modifications all belong to the protection scope of the present disclosure. For example, each specific technical feature described in the above-mentioned specific embodiments may be combined in any suitable way without conflict, and in order to avoid unnecessary repetition, the various possible combinations are not otherwise described in the present disclosure. For another example, Any combination between the various different embodiments of the present disclosure is also possible, as long as they are not inconsistent with the idea of the present disclosure, they should also be regarded as the content disclosed in the present disclosure. For another example, under the premise of no conflict, the various embodiments and/or the technical features in the various embodiments described in the present disclosure may be arbitrarily combined with the prior art, and a technical solution obtained by the combination should also fall within the protection scope of the present disclosure.

It should also be understood that, in the various method embodiments of the present disclosure, the size of the sequence numbers of the above-mentioned processes does not mean an order of execution, the order of execution of the processes shall be determined by their functions and inherent logic, and shall not constitute any limitation on the implementation processes of the embodiments of the present disclosure. In addition, in the embodiments of the present disclosure, the terms "downlink", "uplink" and "sidelink" are used to represent transmission directions of signal or data, where the "downlink" is used to represent that the transmission direction of a signal or data is a first direction transmitting from a site to a user equipment of a cell, and the "uplink" is used to represent that the transmission direction of a signal or data is a second direction transmitting from the user equipment of the cell to the site, and "sidelink" is used to represent that the transmission direction of a signal or data is a third direction transmitting from a user device 1 to a user device 2, and for example, the "downlink signal" represents that the transmission direction of the signal is the first direction. In addition, in the embodiments of the present disclosure, the term "and/or" is only an association relationship describing associated objects, and represents that three relationships may exist. Specifically, "A and/or B" may represent three cases: only A, both A and B, or only B. In addition, the character "/" herein generally represents that associated objects before and after "/" are in an "or" relationship.

Figure 15:
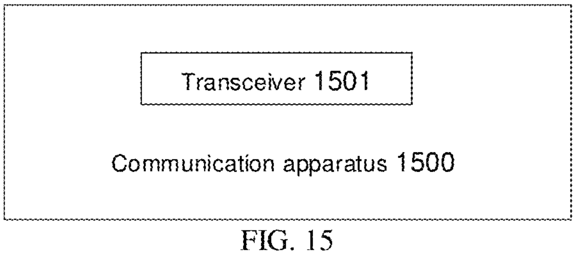
FIG. 15 is a schematic diagram of a structural composition of a communication apparatus provided in an embodiment of the present disclosure.

FIG. 15 is a schematic diagram of a structural composition of a communication apparatus provided in an embodiment of the present disclosure, which is applied to a controlling network element, and as shown in FIG. 15, the communication apparatus 1500 includes:

a transceiver unit 1501, configured to transmit first information to an executing network element; where the first information includes a measurement strategy;

where the measurement policy includes at least one of: a first measurement parameter, a selecting condition for a terminal device, a measurement behavior, or a reporting way;

the first measurement parameter includes at least one of: a delay, a rate, a bandwidth, a packet loss rate, a jitter rate, or a disorder rate.

In some embodiments, the selecting condition for a terminal device includes at least one of:

a terminal device in a connecting state within a specific time range;

a terminal device within a specific area;

a terminal device with a delay lower than a first threshold;

one or more terminal devices with a lowest delay;

a terminal device with a rate higher than or equal to a second threshold;

one or more terminal devices with a highest rate;

a terminal device with a bandwidth greater than or equal to a third threshold;

one or more terminal devices with a largest bandwidth;

a terminal device with a packet loss rate lower than a fourth threshold;

one or more terminal devices with a lowest packet loss rate;

a terminal device with a jitter rate lower than a fifth threshold;

one or more terminal devices with a lowest jitter rate;

a terminal device with a disorder rate lower than a sixth threshold; or one or more terminal devices with a lowest disorder rate.

In some embodiments, the measurement behavior includes one of:

a measurement value of the first measurement parameter being a measurement value in a last time;

a measurement value of the first measurement parameter being a statistical parameter of measurement values in last Q times, where the Q is greater than or equal to 2;

a measurement value of the first measurement parameter being a statistical parameter of measurement values within a first time period, where the first time period is preconfigured, or is indicated in the first information.

In some embodiments, the reporting way includes at least one of:

the executing network element reporting at least one identification of at least one terminal device via a control plane network element;

the executing network element reporting at least one identification of at least one terminal device via a user plane network element;

the executing network element reporting at least one identification of at least one terminal device at a specific time;

the executing network element reporting at least one identification of at least one terminal device periodically; or the executing network element in a set area reporting at least one identification of at least one terminal device.

In some embodiments, the first information also includes a group message corresponding to a first group.

In some embodiments, the group message corresponding to the first group includes at least one of: an identification of the first group, all or a portion of identifications of terminal devices in the first group, or attribute information of the first group.

In some embodiments, the first information further includes: an identification of a terminal device that transmits joining of the first group to the controlling network element and/or an identification of a terminal device consenting to measure.

In some embodiments, all identifications of terminal devices in the first group are all identifications of terminal devices that transmit the joining of the first group to the controlling network element;

the identification of the terminal device consenting to measure is included in identifications of terminal devices that transmit consenting-to-measure to the controlling network element, or is obtained by the controlling network element from a unified data management (UDM) network element and/or a unified data repository (UDR) network element.

In some embodiments, the identification of the terminal device consenting to measure is an identification of a terminal device with the first measurement parameter in the measurement policy included in a second measurement parameter consented to measure, among identifications of terminal devices that transmit consenting-to-measure to the controlling network element, and/or an identification of a terminal device consenting to report a measurement value, and/or an identification of a terminal device consenting to report to an application server.

In some embodiments, the transceiver unit 1501 is further configured to receive request information transmitted by a candidate terminal device or an application server; where the request information indicates that: the candidate terminal device joins the first group and/or the candidate terminal device consents to measure.

In some embodiments, the transceiver unit 1501 is further configured to receive at least one identification of at least one terminal device transmitted by the executing network element; where the at least one identification of the at least one terminal device is determined based on the first information; transmit the at least one identification of the at least one terminal device, to an application server.

In some embodiments, the controlling network element includes at least one of: a session management function (SMF) network element, a policy control function (PCF) network element; and/or the executing network element includes: a user plane function (UPF) network element and/or a local-network exposure function (L-NEF) network element.

Figure 16:
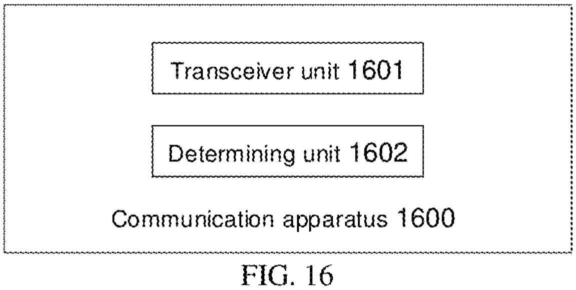
FIG. 16 is a schematic diagram of a structural composition of another communication apparatus provided in an embodiment of the present disclosure.

FIG. 16 is a schematic diagram of a structural composition of another communication apparatus provided in an embodiment of the present disclosure, which is applied to a network device, and as shown in FIG. 16, the communication apparatus 1600 includes:

a transceiver unit 1601, configured to receive first information transmitted by a controlling network element, the first information including a measurement policy;

where the measurement policy includes at least one of: a first measurement parameter, a selecting condition for a terminal device, a measurement behavior, or a reporting way;

the first measurement parameter includes at least one of: a delay, a rate, a bandwidth, a packet loss rate, a jitter rate, or a disorder rate.

In some embodiments, the selecting condition for a terminal device includes at least one of:

a terminal device in a connecting state within a specific time range; a terminal device within a specific area; a terminal device with a delay lower than a first threshold; one or more terminal devices with a lowest delay; a terminal device with a rate higher than or equal to a second threshold; one or more terminal devices with a highest rate; a terminal device with a bandwidth greater than or equal to a third threshold; one or more terminal devices with a largest bandwidth; a terminal device with a packet loss rate lower than a fourth threshold; one or more terminal devices with a lowest packet loss rate; a terminal device with a jitter rate lower than a fifth threshold; one or more terminal devices with a lowest jitter rate; a terminal device with a disorder rate lower than a sixth threshold; or one or more terminal devices with a lowest disorder rate.

In some embodiments, the measurement behavior includes one of:

a measurement value of the first measurement parameter being a measurement value in a last time;

a measurement value of the first measurement parameter being a statistical parameter of measurement values in last Q times, where the Q is greater than or equal to 2;

a measurement value of the first measurement parameter being a statistical parameter of measurement values within a first time period, where the first time period is preconfigured, or is indicated in the first information.

In some embodiments, the reporting way includes at least one of:

the executing network element reporting at least one identification of at least one terminal device via a control plane network element;

the executing network element reporting at least one identification of at least one terminal device via a user plane network element;

the executing network element reporting at least one identification of at least one terminal device at a specific time;

the executing network element reporting at least one identification of at least one terminal device periodically; or the executing network element in a set area reporting at least one identification of at least one terminal device.

In some embodiments, the first information further includes a group message corresponding to a first group.

In some embodiments, the group message corresponding to the first group includes at least one of: an identification of the first group, all or a portion of identifications of terminal devices in the first group, or attribute information of the first group.

In some embodiments, the first information further includes: an identification of a terminal device that transmits joining of the first group to the controlling network element and/or an identification of a terminal device consenting to measure.

In some embodiments, the transceiver unit 1601 is further configured to transmit at least one identification of at least one terminal device to the application server, or transmit, by the executing network element, at least one identification of at least one terminal device to the controlling network element; where the at least one identification of the at least one terminal device is determined based on the first information.

In some embodiments, the transceiver unit 1601 is further configured to: in a case where the first information includes the delay, transmit a measurement data packet to an access network device; and receive a reply data packet transmitted by the access network device;

a determining unit 1602 is further configured to determine a delay based on a time of transmitting the measurement data packet, a time of receiving the reply data packet, and time information carried in the reply data packet; determine at least one identification of at least one terminal device based on the delay.

In some embodiments, the transceiver unit 1601 is further configured to: in a case where the first information includes the delay, transmit a measurement data packet to a candidate terminal device; receive a reply data packet transmitted by the candidate terminal device;

the determining unit 1602 is further configured to determine the delay based on a time of transmitting the measurement data packet, a time of receiving the reply data packet, and time information carried in the reply data packet; determine at least one identification of at least one terminal device based on the delay.

In some embodiments, the time information includes at least one of:

a time point at which the measurement data packet and/or the reply data packet is received by a core network node, an access network device, and/or a candidate terminal device;

a time point at which the measurement data packet and/or the reply data packet is transmitted by a core network node, an access network device, and/or a candidate terminal device;

a data transmission latency of an access network device and a candidate terminal device; or a data transmission latency of a access network device and a core network node.

In some embodiments, a packet header of the measurement data packet carries a first indication; the first indication is used to indicate a measurement delay.

In some embodiments, the controlling network element includes at least one of: a session management function (SMF) network element, a policy control function (PCF) network element; and/or the executing network element includes: a user plane function (UPF) network element and/or a local-network exposure function (L-NEF) network element.

Those skilled in the art should understand that the relevant description of the above-mentioned communication apparatus in the embodiments of the present disclosure may be understood by referring to the relevant description of the communication method in the embodiments of the present disclosure.

Figure 17:
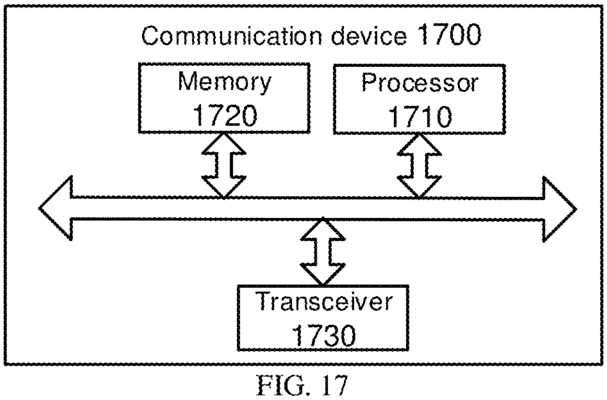
FIG. 17 is a schematic structural diagram of a communication device provided in an embodiment of the present disclosure.

FIG. 17 is a schematic structural diagram of a communication device provided in an embodiment of the present disclosure. The communication device 1700 may include a controlling network element or an executing network element. The communication device 1700 shown in FIG. 17 may include a processor 1710 and a memory 1720, the memory 1720 is configured to store a computer program, and the processor 1710 is configured to invoke and execute the computer program stored in the memory 1720 to perform the communication method according to any one of the above embodiments.

In some embodiments, as shown in FIG. 17, the communication device 1700 may further include the memory 1720. Herein, the processor 1710 may invoke and execute a computer program from the memory 1720 to implement the method in the embodiments of the present disclosure.

Herein, the memory 1720 may be a separate device independent from the processor 1710, or may also be integrated into the processor 1710. In some embodiments, as shown in FIG. 17, the communication device 1700 may further include a transceiver 1730, and the processor 1710 may control the transceiver 1730 to communicate with other devices, specifically, to be able to transmit information or data to other devices, or receive information or data transmitted by other devices.

Herein, the transceiver 1730 may include a transmitter and a receiver. The transceiver 1730 may further include antennas, and the number of the antennas may be one or more. In some embodiments, the communication device 1700 may specifically be the controlling network element or the executing network element of the embodiments of the present disclosure, and the communication device 1700 may implement the corresponding procedure implemented by the controlling network element or the executing network element in various methods of the embodiments of the present disclosure, which will not be repeated here for the sake of brevity.

Figure 18:
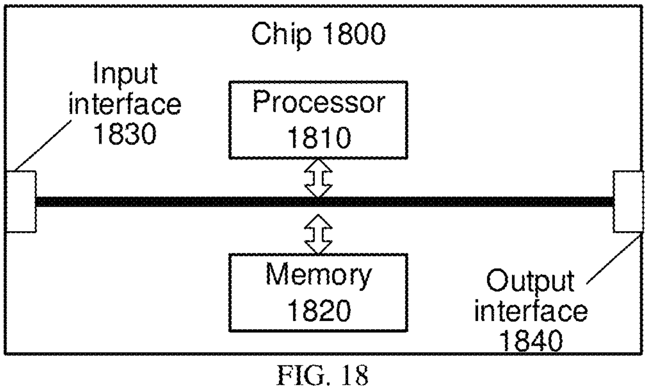
FIG. 18 is a schematic structural diagram of a chip of an embodiment of the present disclosure.

FIG. 18 is a schematic structural diagram of a chip in an embodiment of the present disclosure. The chip 1800 shown in FIG. 18 includes a processor 1810, the processor 1810 is configured to invoke and execute a computer program from a memory to cause a device equipped with the chip to perform the method in the embodiments of the present disclosure.

In some embodiments, as shown in FIG. 18, the chip 1800 may further include a memory 1820. Herein, the processor 1810 may invoke and execute a computer program from the memory 1820 to implement the method in the embodiments of the present disclosure.

Herein, the memory 1820 may be a separate device independent from the processor 1810, or may also be integrated into the processor 1810.

In some embodiments, the chip 1800 may further include an input interface 1830. Herein, the processor 1810 may control the input interface 1830 to communicate with other devices or chips, and specifically, to be able to acquire information or data transmitted by the other devices or chips.

In some embodiments, the chip 1800 may further include an output interface 1840. Herein, the processor 1810 may control the output interface 1840 to communicate with other devices or chips, and specifically, to be able to output information or data to the other devices or chips.

In some embodiments, the chip may be applied to the controlling network element or the executing network element in the embodiments of the present disclosure, and the chip may implement the corresponding procedure implemented by the controlling network element or the executing network element in the various methods of the embodiments of the present disclosure, which will not be repeated here for the sake of brevity. It should be understood that, the chip mentioned in the embodiments of the present disclosure may also be referred to as a system on chip, a system chip, a chip system, or a system-on-chip chip, etc.

The embodiments of the present disclosure also provide a non-transitory computer storage medium for storing a computer program, and the computer program causes the controlling network element or the executing network element to perform the communication method in any one of the embodiments of the present disclosure.

The embodiments of the present disclosure also provide a computer program product, and the computer program product includes a computer program instruction, the computer program instruction causes the controlling network element or the executing network element to perform the communication method in any one of the embodiments of the present disclosure. In some embodiments, the computer program product may be applied to the controlling network element or the executing network element in the embodiments of the present disclosure, and the computer program instruction causes a computer to perform the corresponding procedure implemented by the network equipment in the various methods of the embodiments of the present disclosure, which will not be repeated here for the sake of brevity.

The embodiments of the present disclosure also provide a computer program, and the computer program causes the controlling network element or the executing network element to perform the communication method in any one of the embodiments of the present disclosure. In some embodiments, the computer program may be applied to the controlling network element or the executing network element in the embodiments of the present disclosure, and the computer program, when being executed on a computer, causes the computer to perform the corresponding procedure implemented by the network device in the various methods of the embodiments of the present disclosure, which will not be repeated here for the sake of brevity.

Those skilled in the art should understand that the relevant descriptions for the above-mentioned communication device, computer storage medium, chip, computer program product and computer program in the embodiments of the present disclosure may be understood by referring to the relevant descriptions for the communication method in the embodiments of the present disclosure.

The processor, the communication apparatus or the chip of the embodiments of the present disclosure may be an integrated circuit chip and have a processing capability of signals. In the implementations, various steps of the above method embodiments may be completed by an integrated logic circuit of hardware in the processor or an instruction in a software form. The above-mentioned processor, communication apparatus or chip may include an integration of any one or more of: a general-purpose processor, an Application Specific Integrated Circuit (ASIC), a Digital Signal Processor (DSP), a Digital Signal Processing Device (DSPD), a Programmable Logic Device (PLD), a Field Programmable Gate Array (FPGA), a Central Processing Unit (CPU), a Graphics Processing Unit (GPU), an embedded neural-network processing unit (NPU), a controller, a microcontroller, a microprocessor, a programmable logic device, a discrete gate or transistor logic device, a discrete hardware component. Various methods, steps and logical block diagrams disclosed in the embodiments of the present disclosure may be implemented or performed. A general-purpose processor may be a microprocessor, or the processor may also be any conventional processor, etc. The steps of the method disclosed in combination with the embodiments of the present disclosure may be directly embodied as being performed and completed by a hardware decoding processor, or by using a combination of hardware and software modules in the decoding processor. The software module may be located in the mature storage medium in the art such as the random memory, the flash memory, the read-only memory, the programmable read-only memory or erasable programmable memory, the register. The storage medium is located in the memory, and the processor reads the information in the memory and completes the steps of the above methods in combination with its hardware.

It may be understood that, the memory or computer storage medium in the embodiments of the present disclosure may be a volatile memory or a non-volatile memory, or may include both volatile and non-volatile memories. Herein, the non-volatile memory may be a Read-Only Memory (ROM), a programmable read-only memory (Programmable ROM, PROM), an erasable programmable read-only memory (Erasable PROM, EPROM), an electrically erasable programmable read-only memory (Electrically EPROM, EEPROM) or a flash memory. The volatile memory may be a Random Access Memory (RAM), which is used as an external cache. Through illustrative, rather than limiting, illustration, many forms of RAMs are available, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchronous link dynamic random access memory (Synchlink DRAM, SLDRAM) and a direct Rambus random access memory (Direct Rambus RAM, DR RAM). It should be noted that, the memory of the system and the method described herein is intended to include, but not limited to, these and any other suitable types of memories.

It should be understood that, the above memory and computer storage medium are exemplary but not the limited illustration, e.g., the memory in embodiments of the present disclosure may also be a static Random Access Memory (static RAM, SRAM), a dynamic Random Access Memory (dynamic RAM, DRAM), a synchronous dynamic Random Access Memory (synchronous DRAM, SDRAM), a double data rate synchronous dynamic Random Access Memory (double data rate SDRAM, DDR SDRAM), an enhanced synchronous dynamic Random Access Memory (enhanced SDRAM, ESDRAM), a synch link dynamic Random Access Memory (synch link DRAM, SLDRAM), and a Direct Rambus Random Access Memory (Direct Rambus RAM, DR RAM), etc. That is, the memory in the embodiments of the present disclosure is intended to include, but not limited to, these and any other suitable types of memories.

Those ordinary skilled in the art may realize that, units and algorithm steps of the examples described in combination with the embodiments disclosed herein can be implemented in electronic hardware or in a combination of computer software and electronic hardware. Whether these functions are performed by way of hardware or software depends on a specific application and a design constraint of the technical solution. A skilled person may use different methods for each specific application, to implement the described functions, but such implementation should not be considered beyond the scope of the embodiments of the present disclosure.

It may be clearly understood by those skilled in the art that, for convenience and brevity of the description, specific working procedures of the system, the apparatus and the unit described above may refer to the corresponding procedures in the above method embodiments, which will not be repeated here.

In the several embodiments provided by the application, it should be understood that, the disclosed systems, apparatus, and method may be implemented in other ways. For example, the apparatus embodiments described above are only schematic, for example, the division of the units is only the division of logical functions, and there may be other division methods in an actual implementation, for example, a plurality of units or components may be combined or integrated into another system, or some features may be ignored or not be performed. On the other hand, the coupling or direct coupling or communicative connection with each other as shown or discussed may be indirect coupling or communicative connection of apparatus or units via some interfaces, which may be electrical, mechanical, or in other forms.

The units illustrated as separate components may be or may not be physically separated, and the components shown as units may be or may not be physical units, that is, they may be located in one place, or may also be distributed among a plurality of network units. A part or all of the units may be selected according to actual needs, to implement the purpose of the solutions of the embodiments.

In addition, various functional units in the various embodiments of the present disclosure may be integrated into one processing unit, or the various units may physically exist separately, or two or more units may be integrated into one unit.

If the described functions are implemented in a form of a software functional unit and sold or used as an independent product, they may be stored in a computer readable storage medium. Based on this understanding, the technical solution of the embodiments of the present disclosure essentially, or a part of the technical solution that contributes to the prior art, or a part of the technical solution, may be embodied in a form of a software product, and the computer software product is stored in a storage medium, and includes a plurality of instructions for enabling a computer device (which may be a personal computer, a server, or a network device, etc.) to perform all or some of steps of the methods described in the various embodiments of the present disclosure. And, the storage medium mentioned above includes various mediums that may store program codes, such as a USB flash drive (U disk), a mobile hard disk, a read-only memory (ROM), a random access memory (RAM), a diskette, or an optical disk, etc.

The above is only a specific implementation of the present disclosure, but the protection scope of the present disclosure is not limited thereto, and any skilled familiar with this technical field may easily think of changes or substitutions within the technical scope disclosed in the present disclosure, which should be all covered within the protection scope of the present disclosure. Therefore, the protection scope of the present disclosure should be subject to the protection scope of claims.

What is claimed is:

1. A controlling network element, comprising: a processor and a memory, wherein the memory is configured to store a computer program, and the processor is configured to invoke and execute the computer program stored in the memory to cause the controlling network element to perform:

transmitting first information to an executing network element, the first information comprising a measurement policy; wherein the measurement policy comprises at least one of: a first measurement parameter, a selecting condition for a terminal device, a measurement behavior, or a reporting way;

the first measurement parameter comprises at least one of: a delay, a rate, a bandwidth, a packet loss rate, a jitter rate, or a disorder rate;

wherein the controlling network element further performs:

receiving at least one identification of at least one terminal device transmitted by the executing network element; wherein the at least one identification of the at least one terminal device is determined based on the first information;

transmitting the at least one identification of the at least one terminal device, to an application server.

2. The controlling network element according to claim 1, wherein the selecting condition for a terminal device comprises at least one of:

a terminal device in a connecting state within a specific time range;

a terminal device within a specific area;

a terminal device with a delay lower than a first threshold;

one or more terminal devices with a lowest delay;

a terminal device with a rate higher than or equal to a second threshold;

one or more terminal devices with a highest rate;

a terminal device with a bandwidth greater than or equal to a third threshold;

one or more terminal devices with a largest bandwidth;

a terminal device with a packet loss rate lower than a fourth threshold;

one or more terminal devices with a lowest packet loss rate;

a terminal device with a jitter rate lower than a fifth threshold;

one or more terminal devices with a lowest jitter rate;

a terminal device with a disorder rate lower than a sixth threshold; or one or more terminal devices with a lowest disorder rate.

3. The controlling network element according to claim 1, wherein the measurement behavior comprises one of:

a measurement value of the first measurement parameter being a measurement value in a last time;

a measurement value of the first measurement parameter being a statistical parameter of measurement values in last Q times, wherein the Q is greater than or equal to 2;

a measurement value of the first measurement parameter being a statistical parameter of measurement values within a first time period, wherein the first time period is preconfigured, or is indicated in the first information.

4. The controlling network element according to claim 1, wherein the reporting way comprises at least one of:

the executing network element reporting at least one identification of at least one terminal device via a control plane network element;

the executing network element reporting at least one identification of at least one terminal device via a user plane network element;

the executing network element reporting at least one identification of at least one terminal device at a specific time;

the executing network element reporting at least one identification of at least one terminal device periodically; or the executing network element in a set area reporting at least one identification of at least one terminal device.

5. The controlling network element according to claim 1, wherein the first information further comprises a group message corresponding to a first group.

6. The controlling network element according to claim 5, wherein the group message corresponding to the first group comprises at least one of: an identification of the first group, all or a portion of identifications of terminal devices in the first group, or attribute information of the first group.

7. The controlling network element according to claim 5, wherein the first information further comprises: an identification of a terminal device that transmits joining of the first group to the controlling network element and/or an identification of a terminal device consenting to measure.

8. The controlling network element according to claim 7, wherein the identification of the terminal device consenting to measure is comprised in identifications of terminal devices that transmit consenting-to-measure to the controlling network element, or is obtained by the controlling network element from a unified data management (UDM) network element and/or a unified data repository (UDR) network element.

9. The controlling network element according to claim 7, wherein the identification of the terminal device consenting to measure is an identification of a terminal device with the first measurement parameter in the measurement policy comprised in a second measurement parameter consented to measure, among identifications of terminal devices that transmit consenting-to-measure to the controlling network element, and/or an identification of a terminal device consenting to report a measurement value, and/or an identification of a terminal device consenting to report to an application server.

10. The controlling network element according to claim 7, wherein the controlling network element further performs:

receiving request information transmitted by a candidate terminal device or an application server; wherein the request information indicates that: the candidate terminal device joins the first group and/or the candidate terminal device consents to measure.

11. The controlling network element according to claim 1, wherein the controlling network element comprises at least one of: a session management function (SMF) network element, or a policy control function (PCF) network element; and/or the executing network element comprises: a user plane function (UPF) network element and/or a local-network exposure function (L-NEF) network element.

12. An executing network element, comprising: a processor and a memory, wherein the memory is configured to store a computer program, and the processor is configured to invoke and execute the computer program stored in the memory to cause the executing network element to perform:

receiving first information transmitted by a controlling network element, the first information comprising a measurement policy;

wherein the measurement policy comprises at least one of: a first measurement parameter, a selecting condition for a terminal device, a measurement behavior, or a reporting way;

the first measurement parameter comprises at least one of: a delay, a rate, a bandwidth, a packet loss rate, a jitter rate, or a disorder rate;

wherein the executing network element further performs:

transmitting at least one identification of at least one terminal device to an application server, or transmitting at least one identification of at least one terminal device to the controlling network element; wherein the at least one identification of the at least one terminal device is determined based on the first information.

13. The executing network element according to claim 12, wherein the selecting condition for a terminal device comprises at least one of:

a terminal device in a connecting state within a specific time range;

a terminal device within a specific area;

a terminal device with a delay lower than a first threshold;

one or more terminal devices with a lowest delay;

a terminal device with a rate higher than or equal to a second threshold;

one or more terminal devices with a highest rate;

a terminal device with a bandwidth greater than or equal to a third threshold;

one or more terminal devices with a largest bandwidth;

a terminal device with a packet loss rate lower than a fourth threshold;

one or more terminal devices with a lowest packet loss rate;

a terminal device with a jitter rate lower than a fifth threshold;

one or more terminal devices with a lowest jitter rate;

a terminal device with a disorder rate lower than a sixth threshold; or one or more terminal devices with a lowest disorder rate.

14. The executing network element according to claim 12, wherein the measurement behavior comprises one of:

a measurement value of the first measurement parameter being a measurement value in a last time;

a measurement value of the first measurement parameter being a statistical parameter of measurement values in last Q times, wherein the Q is greater than or equal to 2;

a measurement value of the first measurement parameter being a statistical parameter of measurement values within a first time period, wherein the first time period is preconfigured, or is indicated in the first information.

15. The executing network element according to claim 12, wherein the reporting way comprises at least one of:

the executing network element reporting at least one identification of at least one terminal device via a control plane network element;

the executing network element reporting at least one identification of at least one terminal device via a user plane network element;

the executing network element reporting at least one identification of at least one terminal device at a specific time;

the executing network element reporting at least one identification of at least one terminal device periodically; or the executing network element in a set area reporting at least one identification of at least one terminal device.

16. The executing network element according to claim 12, wherein the first information further comprises a group message corresponding to a first group.

17. The executing network element according to claim 16, wherein the group message corresponding to the first group comprises at least one of: an identification of the first group, all or a portion of identifications of terminal devices in the first group, or attribute information of the first group.

18. The executing network element according to claim 16, wherein the first information further comprises: an identification of a terminal device that transmits joining of the first group to the controlling network element and/or an identification of a terminal device consenting to measure.

* * * * *